(12) United States Patent
Szatmary et al.

(10) Patent No.: US 10,105,841 B1
(45) Date of Patent: Oct. 23, 2018

(54) APPARATUS AND METHODS FOR PROGRAMMING AND TRAINING OF ROBOTIC DEVICES

(71) Applicant: BRAIN CORPORATION, San Diego, CA (US)

(72) Inventors: Botond Szatmary, San Diego, CA (US); Oyvind Grotmol, San Diego, CA (US); Eugene Izhikevich, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 195 days.

(21) Appl. No.: 14/613,237

(22) Filed: Feb. 3, 2015

Related U.S. Application Data

(60) Provisional application No. 62/059,039, filed on Oct. 2, 2014.

(51) Int. Cl.
*B25J 9/16* (2006.01)
*G06N 99/00* (2010.01)
*B25J 9/00* (2006.01)

(52) U.S. Cl.
CPC .............. *B25J 9/163* (2013.01); *B25J 9/0081* (2013.01); *B25J 9/161* (2013.01); *G06N 99/005* (2013.01); *Y10S 901/01* (2013.01); *Y10S 901/03* (2013.01)

(58) Field of Classification Search
CPC .......... B25J 9/163; B25J 9/0081; B25J 9/161; G06N 99/005; Y10S 901/01; Y10S 901/03

(Continued)

(56) References Cited

U.S. PATENT DOCUMENTS

| 3,920,972 A | 11/1975 | Corwin, Jr. et al. |
| 4,468,617 A | 8/1984 | Ringwall |

(Continued)

FOREIGN PATENT DOCUMENTS

| CN | 102226740 A | 10/2011 |
| EP | 2384863 A2 | 11/2011 |

(Continued)

OTHER PUBLICATIONS http://www.braincorporation.com/specs/13StemSpecSheet_Rev_Nov11_2013.pdf.

(Continued)

*Primary Examiner* — Jelani A Smith
*Assistant Examiner* — Majdi Alsomiri
(74) *Attorney, Agent, or Firm* — Reed Smith LLP; Sidharth Kapoor

(57) ABSTRACT

Apparatus and methods for training and operating of robotic devices. Robotic controller may comprise a plurality of predictor apparatus configured to generate motor control output. One predictor may be operable in accordance with a pre-configured process; another predictor may be operable in accordance with a learning process configured based on a teaching signal. An adaptive combiner component may be configured to determine a combined control output controller block may provide control output that may be combined with the predicted control output. The pre-programmed predictor may be configured to operate a robot to perform a task. Based on detection of a context, the controller may adaptively switch to use control output of the learning process to perform the given or another task. User feedback may be utilized during learning.

19 Claims, 10 Drawing Sheets

(58) Field of Classification Search
USPC .......................................................... 701/36
See application file for complete search history.

(56) References Cited

U.S. PATENT DOCUMENTS

| | | | |
|---|---|---|---|
| 4,617,502 A | 10/1986 | Sakaue et al. |
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg et al. |
| 4,925,312 A | 5/1990 | Onaga et al. |
| 5,063,603 A | 11/1991 | Burt |
| 5,092,343 A | 3/1992 | Spitzer et al. |
| 5,121,497 A | 6/1992 | Kerr et al. |
| 5,245,672 A | 9/1993 | Wilson et al. |
| 5,303,384 A | 4/1994 | Rodriguez et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,612,883 A | 3/1997 | Shaffer et al. |
| 5,638,359 A | 6/1997 | Peltola et al. |
| 5,673,367 A | 9/1997 | Buckley |
| 5,687,294 A | 11/1997 | Jeong |
| 5,719,480 A | 2/1998 | Bock et al. |
| 5,739,811 A | 4/1998 | Rosenberg et al. |
| 5,828,812 A | 10/1998 | Khan et al. |
| 5,841,959 A | 11/1998 | Guiremand |
| 5,875,108 A | 2/1999 | Hoffberg et al. |
| 5,943,660 A | 8/1999 | Yesildirek et al. |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,243,622 B1 | 6/2001 | Yim et al. |
| 6,259,988 B1 | 7/2001 | Galkowski et al. |
| 6,272,479 B1 | 8/2001 | Farry et al. |
| 6,363,369 B1 | 3/2002 | Liaw et al. |
| 6,366,293 B1 | 4/2002 | Hamilton et al. |
| 6,442,451 B1 | 8/2002 | Lapham |
| 6,458,157 B1 | 10/2002 | Suaning |
| 6,489,741 B1 | 12/2002 | Genov et al. |
| 6,493,686 B1 | 12/2002 | Francone et al. |
| 6,532,454 B1 | 3/2003 | Werbos |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,636,781 B1 | 10/2003 | Shen et al. |
| 6,643,627 B2 | 11/2003 | Liaw et al. |
| 6,697,711 B2 | 2/2004 | Yokono et al. |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe et al. |
| 7,024,276 B2 | 4/2006 | Ito |
| 7,243,334 B1 | 7/2007 | Berger et al. |
| 7,324,870 B2 | 1/2008 | Lee et al. |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,426,920 B1 | 9/2008 | Petersen |
| 7,668,605 B2 | 2/2010 | Braun et al. |
| 7,672,920 B2 | 3/2010 | Ito et al. |
| 7,752,544 B2 | 7/2010 | Cheng et al. |
| 7,849,030 B2 | 12/2010 | Ellingsworth |
| 8,015,130 B2 | 9/2011 | Matsugu et al. |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre et al. |
| 8,340,823 B2 | 12/2012 | Ohno et al. |
| 8,364,314 B2 | 1/2013 | Abdallah et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich et al. |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee et al. |
| 8,793,205 B1 | 7/2014 | Fisher et al. |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,122,994 B2 * | 9/2015 | Piekniewski .......... G06N 3/049 |
| 9,144,907 B2 | 9/2015 | Summer et al. |
| 9,177,245 B2 | 11/2015 | Richert et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 9,314,924 B1 | 4/2016 | Laurent et al. |
| 9,792,546 B2 | 10/2017 | Passot et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters et al. |
| 2002/0175894 A1 | 11/2002 | Grillo |
| 2002/0198854 A1 | 12/2002 | Berenji et al. |
| 2003/0023347 A1 | 1/2003 | Konno et al. |
| 2003/0050903 A1 | 3/2003 | Liaw et al. |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta et al. |
| 2004/0128028 A1 | 7/2004 | Miyamoto et al. |
| 2004/0131998 A1 | 7/2004 | Marom et al. |
| 2004/0136439 A1 | 7/2004 | Dewberry et al. |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan et al. |
| 2004/0267404 A1 | 12/2004 | Danko |
| 2005/0004710 A1 | 1/2005 | Shimomura et al. |
| 2005/0008227 A1 | 1/2005 | Duan et al. |
| 2005/0015351 A1 | 1/2005 | Nugent |
| 2005/0036649 A1 | 2/2005 | Yokono et al. |
| 2005/0049749 A1 | 3/2005 | Watanabe et al. |
| 2005/0054381 A1 | 3/2005 | Lee et al. |
| 2005/0065650 A1 | 3/2005 | Lewis |
| 2005/0065651 A1 | 3/2005 | Ayers et al. |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu et al. |
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |

(56) References Cited

U.S. PATENT DOCUMENTS

| | | |
|---|---|---|
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh et al. |
| 2006/0189900 A1 | 8/2006 | Flaherty et al. |
| 2006/0207419 A1 | 9/2006 | Okazaki et al. |
| 2006/0230140 A1 | 10/2006 | Aoyama et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0114710 A1 | 5/2008 | Pucher |
| 2008/0133052 A1 | 6/2008 | Jones et al. |
| 2008/0140257 A1 | 6/2008 | Sato et al. |
| 2008/0154428 A1 | 6/2008 | Nagatsuka et al. |
| 2008/0162391 A1 | 7/2008 | Izhikevich |
| 2008/0208391 A1 | 8/2008 | Hasegawa et al. |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0037351 A1 | 2/2009 | Kristal et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe et al. |
| 2011/0202174 A1 | 8/2011 | Bogash et al. |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter et al. |
| 2011/0319714 A1 | 12/2011 | Roelle et al. |
| 2012/0008838 A1 | 1/2012 | Guyon et al. |
| 2012/0011090 A1 | 1/2012 | Tang et al. |
| 2012/0011093 A1 | 1/2012 | Aparin et al. |
| 2012/0017232 A1 | 1/2012 | Hoffberg et al. |
| 2012/0022688 A1 | 1/2012 | Wong et al. |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0071752 A1 | 3/2012 | Sewell et al. |
| 2012/0079670 A1 | 4/2012 | Yoon et al. |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur et al. |
| 2012/0173021 A1 | 7/2012 | Tsusaka |
| 2012/0185092 A1 | 7/2012 | Ku |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0221147 A1 | 8/2012 | Goldberg et al. |
| 2012/0268580 A1 | 10/2012 | Kim et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1* | 12/2012 | Piekniewski ......... G06N 3/049 382/103 |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth et al. |
| 2013/0066468 A1 | 3/2013 | Choi et al. |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0096719 A1 | 4/2013 | Sanders et al. |
| 2013/0116827 A1 | 5/2013 | Inazumi |
| 2013/0118288 A1 | 5/2013 | Liu |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0206170 A1 | 8/2013 | Svendsen et al. |
| 2013/0218339 A1 | 8/2013 | Maisonnier et al. |
| 2013/0218821 A1 | 8/2013 | Szatmary et al. |
| 2013/0238122 A1 | 9/2013 | Hodgins et al. |
| 2013/0245829 A1 | 9/2013 | Ohta et al. |
| 2013/0251278 A1 | 9/2013 | Izhikevich et al. |
| 2013/0274924 A1 | 10/2013 | Chung et al. |
| 2013/0278631 A1 | 10/2013 | Border et al. |
| 2013/0297541 A1 | 11/2013 | Piekniewski et al. |
| 2013/0297542 A1 | 11/2013 | Piekniewski et al. |
| 2013/0310979 A1 | 11/2013 | Herr et al. |
| 2013/0325244 A1 | 12/2013 | Wang et al. |
| 2013/0325766 A1 | 12/2013 | Petre et al. |
| 2013/0325768 A1 | 12/2013 | Sinyavskiy et al. |

(56) References Cited

U.S. PATENT DOCUMENTS

| | | |
|---|---|---|
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0075004 A1 | 3/2014 | Van et al. |
| 2014/0081895 A1 | 3/2014 | Coenen et al. |
| 2014/0089232 A1 | 3/2014 | Buibas et al. |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1* | 9/2014 | Izhikevich .............. B25J 9/163 700/250 |
| 2014/0277744 A1 | 9/2014 | Coenen |
| 2014/0298212 A1 | 10/2014 | Wen |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0066479 A1 | 3/2015 | Pasupalak et al. |
| 2015/0077323 A1 | 3/2015 | Ramaswamy et al. |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0185027 A1 | 7/2015 | Kikkeri et al. |
| 2015/0204559 A1 | 7/2015 | Hoffberg et al. |
| 2015/0217449 A1 | 8/2015 | Meier et al. |
| 2015/0242746 A1 | 8/2015 | Rao et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |
| 2016/0075015 A1 | 3/2016 | Izhikevich et al. |
| 2016/0086050 A1 | 3/2016 | Piekniewski et al. |
| 2016/0086051 A1 | 3/2016 | Piekniewski |
| 2016/0086052 A1 | 3/2016 | Piekniewski et al. |
| 2016/0096270 A1 | 4/2016 | Ibarz et al. |
| 2016/0096272 A1 | 4/2016 | Smith et al. |

FOREIGN PATENT DOCUMENTS

| | | | |
|---|---|---|---|
| JP | H0487423 | A | 3/1992 |
| JP | 2003175480 | A | 6/2003 |
| RU | 2108612 | C1 | 4/1998 |
| WO | WO-2008083335 | A2 | 7/2008 |
| WO | WO-2010136961 | A1 | 12/2010 |
| WO | WO-2011039542 | A1 | 4/2011 |
| WO | WO-2012151585 | A2 | 11/2012 |

OTHER PUBLICATIONS

Specification, figures and EFS receipt of U.S. Appl. No. 14/244,888, filed Apr. 3, 2014 and entitled "Learning apparatus and methods for control of robotic devices via spoofing" (100 pages).

Specification, figures and EFS receipt of U.S. Appl. No. 14/244,890, filed Apr. 3, 2014 and entitled "Apparatus and methods for remotely controlling robotic devices" (91 pages).

Specification, figures and EFS receipt of U.S. Appl. No. 14/244,892, filed Apr. 3, 2014 and entitled "Spoofing remote control apparatus and methods" (95 pages).

Specification, figures and EFS receipt of U.S. Appl. No. 14/265,113, filed Apr. 29, 2014 and entitled "Trainable convolutional network apparatus and methods for operating a robotic vehicle" (71 pages).

Specification, figures and EFS receipt of U.S. Appl. No. 14/285,385, filed May 22, 2014 and entitled "Apparatus and methods for real time estimation of differential motion in live video" (42 pages).

Specification, figures and EFS receipt of U.S. Appl. No. 14/285,414, filed May 22, 2014 and entitled "Apparatus and methods for distance estimation using multiple image sensors" (63 pages).

Specification, figures and EFS receipt of U.S. Appl. No. 14/285,466, filed May 22, 2014 and entitled "Apparatus and methods for robotic operation using video imagery" (64 pages).

Specification, figures and EFS receipt of U.S. Appl. No. 14/321,736, filed Jul. 1, 2014 and entitled "Optical detection apparatus and methods" (49 pages).

Specification, figures and EFS receipt of U.S. Appl. No. 14/326,374, filed Jul. 8, 2014 and entitled "Apparatus and methods for distance estimation using stereo imagery" (75 pages).

Specification, figures and EFS receipt of U.S. Appl. No. 14/489,242, filed Sep. 17, 2014 and entitled "Apparatus and methods for remotely controlling robotic devices" (100 pages).

Specification, figures and EFS receipt of U.S. Appl. No. 14/542,391, filed Nov. 14, 2014 and entitled "Feature detection apparatus and methods for training of robotic navigation" (83 pages).

Specification, figures and EFS receipt of U.S. Appl. No. 14/588,168, filed Dec. 31, 2014 and entitled—Apparatus and methods for training robots (101 pages).

Specification, figures and EFS receipt of U.S. Appl. No. 14/637,138, filed Mar. 3, 2015 and entitled "Salient features tracking apparatus and methods using visual initialization" (66 pages).

Specification, figures and EFS receipt of U.S. Appl. No. 14/637,164, filed Mar. 3, 2015 and entitled "Apparatus and methods for tracking salient features" (66 pages).

Specification, figures and EFS receipt of U.S. Appl. No. 14/637,191, filed Mar. 3, 2015 and entitled "Apparatus and methods for saliency detection based on color occurrence analysis" (66 pages).

Specification, figures and EFS receipt of U.S. Appl. No. 14/705,487, filed May 6, 2015 and entitled—Persistent predictor apparatus and methods for task switching (119 pages).

A Neural Network for Ego-motion Estimation from Optical Flow, by Branka, Published 1995.

Abbott L. F. and Nelson S.B. (2000), "Synaptic plasticity: taming the beast", Nature Neuroscience, 3, 1178-1183.

Alexandros <g class="gr_ gr_3 gr-alert gr_spell ContextualSpelling ins-del multiReplace" id="3" data-gr-id="3">Bouganis</g> and Murray Shanahan, "Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Alvarez, "Review of Approximation Techniques," PhD thesis, chapter 2, pp. 7-14, University of Bradford, 2000.

(56) References Cited

OTHER PUBLICATIONS

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <ahref="http://msc.berkeley.edu/wjchen/publications/DSC12. sub.--8726.sub.--Fl-.pdf">http://msc.berkeley.edu/wjchen/ publications/DSC12.sub.--8726.sub.--Fl-.pdf</a><http: />.

Bartlett et al., "Convexity, Classification, and Risk Bounds" Jun. 16, 2005, pp. 1-61.

Bartlett., et al., "Large Margin Classifiers: Convex Loss, Low Noise, and Convergence Rates," Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi. nl/~sbohte/publication/phdthesis.pdf">http://homepages.cwi.nl/ ~sbohte/publication/phdthesis.pdf<a><url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Chung Hyuk Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet: <URL:https://smartech.gatech.edu!bitstream/handle/1853/38279/ IEEE_2010_ICRA_002.pdf>.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/ FloreanoDuerrMattiussi2008.pdf<http: />.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gewaltig et al.. 'NEST (Neural Simulation Tool)', Scholarpedia, 2007. pp. I-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www. neurophys.biomedicale.univparis5. fr/graham/surf-hippo-files/Surf-Hippo%20Reference%20Manual.pdf, Mar. 2002. pp. 1-128.

Graham The Surf Hippo User Manual Version 3.0 B. Unite de Neurosiences Integratives et Computationnelles Institut Federatif de Neurobiologie Alfred Fessard CNRS. France. Mar. 2002 [retrieved Jan. 16, 2014]. [retrieved biomedical.univ-paris5.fr ].

Grollman., et al., "Dogged Learning for Robots," IEEE International Conference on Robotics and Automation (ICRA), 2007.

Huang, Fall Detection Using Modular Neural Networks with Back-projected Optical Flow, Published 2007.

Izhikevich E.M. (2006) Polychronization: Computation With Spikes. Neural Computation, 18:245-282.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.

Kalman Filter; wikipedia.

Karbowski et al., 'Multispikes and Synchronization in a Large Neural Network with Temporal Delays', Neural Computation 12. 1573-1606 (2000).

Kasabov, "Evolving Spiking Neural Networks for Spatio-and Spectro-Temporal Pattern Recognition", IEEE 6th International Conference Intelligent Systems 2012 [Retrieved on Jun 24, 2014], Retrieved from the Internet: <a href="http://ncs.ethz.ch/projects/evospike/ publications/evolving-spiking-neural-networks-for-spatio-and-spectro-temporal-pattern-recognition-plenary-talk-ieee-is/view">http:// ncs.ethz.ch/projects/evospike/publications/evolving-spiking-neural-networks-for-spatio-and-spectro-temporal-pattern-recognition-plenary-talk-ieee-is/view</a>.

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/ Khotanzad. pdf.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail? id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar., et al., "Consistent recovery of sensory stimuli encoded with MIMO neural circuits," Computational intelligence and neuroscience, 2009.

Lazar et al. 'Consistent recovery of sensory stimuli encoded with MIMO neural circuits.' Computational intelligence and neuroscience (2010): 2.

Makridakis et al., "Evaluating Accuracy (or Error) Measures", INSEAD Technical Report, 1995/18/TM.

Masquelier, Timothee, 'Relative spike time coding and Stop-based orientation selectivity in the early visual system in natural continuous and saccadic vision: a computational model.' Journal of computational neuroscience 32.3 (2012): 425-441.

Miller III, "Real-Time Application of Neural Networks for Sensor-Based Control of Robots with Vision," IEEE Transactions on Systems, Man, and Cypernetics Jul./Aug. 1989, vol. 19 (4), pp. 825-831.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

(56) References Cited

OTHER PUBLICATIONS

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi=0.1.1.5.4346&rep—repl&type-pdf.

Sato et al., 'Pulse interval and width modulation for video transmission.' Cable Television, IEEE Transactions on 4 (1978): 165-173.

Schemmel, J., Grub!, A., Meier, K., Mueller, E.: Implementing synaptic plasticity in a VLSI spiking neural network model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/download.cgi/4620/ps/1774.pdf> Introduction.

Simulink.RTM. model [online], [Retrieved on Dec. 10, 2013] Retrieved from <URL: http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879<url:></url:>.

Visual Navigation with a Neural Network, by HATSOPOULOS, Published 1991.

Walters, "Implementation of Self-Organizing Neural Networks for Visuo-Motor Control of an Industrial Robot," IEEE Transactions on Neural Networks, vol. 4 (1), Jan 1993, pp. 86-95.

Wang 'The time dimension for scene analysis.' Neural Networks, IEEE Transactions on 16.6 (2005): 1401-1426.

Zhou, Computation of Optical Flow Using a Neural Network, Published 1988.

Li S., et al., "Random KNN feature selection—a fast and stable alternative to Random Forests," BMC Bioinformatics, 2011, vol. 12(450), pp. 1-11.

Manduchi R., et al., "Obstacle Detection and Terrain Classification for Autonomous Off-Road Navigation," Autonomous Robots, 2005, vol. 18, pp. 81-344.

Mehrotra K., et al., Elements of Artificial Neural Networks, A Bradford Book, The MIT Press Cambridge, Massachusetts London, England, 1997, 351 pages.

Mehrotra K., et al., "Elements of Artificial Neural Networks," MIT press,1997, pp. 1-76.

* cited by examiner

APPARATUS AND METHODS FOR PROGRAMMING AND TRAINING OF ROBOTIC DEVICES

CROSS-REFERENCE TO RELATED APPLICATIONS

This application claims the priority benefit of co-owned U.S. Provisional Patent Application Ser. No. 62/059,039 entitled "APPARATUS AND METHODS FOR TRAINING OF ROBOTS", filed Oct. 2, 2014, which is incorporated herein by reference in its entirety. This application is related to co-pending and co-owned U.S. patent application Ser. No. 14/542,391 entitled "FEATURE DETECTION APPARATUS AND METHODS FOR TRAINING OF ROBOTIC NAVIGATION", filed Nov. 14, 2014, co-owned and co-pending U.S. patent application Ser. No. 14/070,239 entitled "REDUCED DEGREE OF FREEDOM ROBOTIC CONTROLLER APPARATUS AND METHODS", filed Nov. 1, 2013, co-owned and co-pending U.S. patent application Ser. No. 14/070,269 entitled "APPARATUS AND METHODS FOR OPERATING ROBOTIC DEVICES USING SELECTIVE STATE SPACE TRAINING", filed Nov. 1, 2013, co-owned U.S. patent application Ser. No. 14/070,114 entitled "APPARATUS AND METHODS FOR ONLINE TRAINING OF ROBOTS", filed Nov. 1, 2013, and issued as U.S. Pat. No. 9,263,571, co-owned and co-pending U.S. patent application Ser. No. 14/244,890 entitled "APPARATUS AND METHODS FOR REMOTELY CONTROLLING ROBOTIC DEVICES", filed Apr. 3, 2014, co-owned U.S. patent application Ser. No. 13/918,338 entitled "ROBOTIC TRAINING APPARATUS AND METHODS", filed Jun. 14, 2013, and issued as U.S. Pat. No. 9,384,443, co-owned and co-pending U.S. patent application Ser. No. 13/918,298 entitled "HIERARCHICAL ROBOTIC CONTROLLER APPARATUS AND METHODS", filed Jun. 14, 2013, co-owned U.S. patent application Ser. No. 13/907,734 entitled "ADAPTIVE ROBOTIC INTERFACE APPARATUS AND METHODS", filed May 31, 2013, and issued as U.S. Pat. No. 9,242,372, co-owned and co-pending U.S. patent application Ser. No. 13/842,530 entitled "ADAPTIVE PREDICTOR APPARATUS AND METHODS", filed Mar. 15, 2013, co-owned U.S. patent application Ser. No. 13/842,562 entitled "ADAPTIVE PREDICTOR APPARATUS AND METHODS FOR ROBOTIC CONTROL", filed Mar. 15, 2013, co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, co-owned U.S. patent application Ser. No. 13/842,647 entitled "MULTICHANNEL ROBOTIC CONTROLLER APPARATUS AND METHODS", filed Mar. 15, 2013, and co-owned U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates to, inter alia, computerized apparatus and methods for training of robotic devices to perform various tasks.

BACKGROUND

Robotic devices are used in a variety of industries, such as manufacturing, medical, safety, military, exploration, and/or other. Robotic "autonomy", i.e., the degree of human control, varies significantly according to application. Some existing robotic devices (e.g., manufacturing assembly and/or packaging) may be programmed in order to provide desired functionality without further supervision. Some robotic devices (e.g., surgical robots) may be controlled by humans.

Robotic devices may comprise hardware components that enable the robot to perform actions in 1-dimension (e.g., a single range of movement), 2-dimensions (e.g., a plane of movement), and/or 3-dimensions (e.g., a space of movement). Typically, movement is characterized according to so-called "degrees of freedom". A degree of freedom is an independent range of movement; a mechanism with a number of possible independent relative movements (N) is said to have N degrees of freedom. Some robotic devices may operate with multiple degrees of freedom (e.g., a turret and/or a crane arm configured to rotate around vertical and/or horizontal axes). Other robotic devices may be configured to follow one or more trajectories characterized by one or more state parameters (e.g., position, velocity, acceleration, orientation, and/or other). It is further appreciated that some robotic devices may simultaneously control multiple actuators (degrees of freedom) resulting in very complex movements.

Users may utilize robots that provide functionality out of the box (e.g., pre-programmed). Some users may train a robot with supervised learning to perform a task (e.g., navigation, manipulation, and/or other tasks).

SUMMARY

One aspect of the disclosure relates to an apparatus for controlling a robot. The apparatus may comprise a sensor, a predictor component, an input interface, an evaluation component, a learning predictor component, and a combiner. The sensor interface may be configured to receive a first representation of an object associated with an environment of the robot. The predictor component may be configured to determine a first control output. The first control output may be configured to cause the robot to execute a task in accordance with the first representation of the object. The input interface may be configured to receive a teaching input associated with a second representation of the object. The teaching input may be configured to convey information related to a target trajectory associated with execution of the task by the robot. The evaluation component may be configured to provide a second control output based on an evaluation of the control signal and the teaching input. The learning predictor component may be configured to determine a third control output. The third control output may be determined based on analysis of the first representation of the object and the second control output. The combiner may be configured to combine the first control output and the third control output to produce a fourth control output. The fourth control output may be configured to cause the robot to execute the task in accordance with the first representation of the object.

Execution of the task based on the fourth control output may produce a first trajectory that is closer to the target trajectory compared to a second trajectory associated with execution of the task based on the first control output.

In some implementations, the learning predictor component may be operable in accordance with a learning process. The learning process may be configured to determine an association between the object representation and the second control output. The learning process may be characterized by a learning configuration that is adapted based on an occurrence of the object representation contemporaneously with provisioning of the second control output.

In some implementations, the learning process may comprise a spiking neuron classifier. The spiking neuron classifier may comprise a plurality of spiking neurons interconnected via a plurality of connections. Individual ones of the plurality of connections may be characterized by connection efficacy. The learning configuration adaptation may comprise modifying efficacy of one or more of the plurality of connections.

In some implementations, the learning process may comprise a look up table comprising a plurality of entries. The determination of the third control output by the learning process may comprise incrementing an entry of the plurality of entries based on an occurrence of the first representation of the object contemporaneously with provisioning of the third control output.

In some implementations, the predictor component may be configured to provide to the learning process confidence information associated with the first control output. The learning process may comprise a look up table comprising a plurality of entries. The determination of the third control output by the learning process may comprise incrementing an entry of the plurality of entries based on an occurrence of the first representation of the object contemporaneously with provisioning of the second control output and provided that the confidence information satisfies a given condition.

In some implementations, the first representation of the object, the first control output, and the second control output may comprise a plurality of features of a first type and one or more features of a second type. The determination of third control output by the learning process may comprise: determining a subset of features by randomly selecting a portion of the plurality of features and at least one feature from the second input features; comparing individual features of the subset to corresponding features of a plurality of training feature sets, individual ones of the plurality of training feature sets comprising a number of training features, the number being equal to or greater than the quantity of features within the subset of features; based on the comparison, determining a similarity measure for a given training set of the plurality of training feature sets, the similarity measure characterizing similarity between features of the subset and features of the given training set; responsive to the similarity measure breaching a threshold, selecting one or more training sets from the plurality of training sets; determining one or more potential control outputs, individual ones of the one or more potential control outputs being associated with a corresponding training set of the plurality of training sets; and determining the third control output based on a transformation obtained from the one or more potential control outputs. Individual ones of the plurality of training feature sets may comprise features of the first type and at least one feature of the second type. Individual ones of the plurality of training feature sets are obtained during training operation of the robot. The training operation may be performed responsive to receiving a training signal from the robot. Individual ones of the one or more potential control outputs may be determined based on the training signal and the features of the given training set.

In some implementations, the similarity measure may be determined based on a difference between values of the features of the subset and values of the features of the given training set.

In some implementations, the similarity measure may be determined based on a distance between individual features of the subset of features and corresponding features of the given training set.

In some implementations, execution of the task based solely on the third control output may be configured to produce a third trajectory that is farther from the target trajectory compared to the second trajectory.

In some implementations, the robot may comprise a vehicle. The vehicle may comprise a platform configured to move in at least one dimension. The apparatus may be disposed on the platform. The training input may be provided by an entity disposed external to the platform.

In some implementations, the apparatus may comprise a wireless communications interface configured to receive remote data transmissions from the entity. The training input may be provided via the remote data transmissions. The training input may be configured based on an evaluation of the second representation of the object. The second representation may be distinct from the first representation.

In some implementations, the evaluation component may be configured to produce the second control output based on a discrepancy between the control signal and the teaching input.

In some implementations, the combiner may be operable in accordance with at least one of an addition or a union operation on the first control output and the third control output.

In some implementations, the combination may be configured based on a concatenation of the first control output and the third control output.

In some implementations, the apparatus may comprise another combiner component configured to combine the fourth control output and the training input to produce a motor control output. The combination of the fourth control output and the training input may be characterized by a transfer function. The robot may comprise an actuator configured to displace at least a portion of the robot in at least one dimension based on application of the motor control output. The transfer function may be configured to provide an override combination wherein the a motor control output is configured based solely on the teaching provided the teaching signal satisfies a given condition.

Another aspect of the disclosure relates to a non-transitory computer-readable storage medium having instructions embodied thereon. The instructions may be executable by a processor to perform a method of determining a combined control output for a task being executed by a robot. The method may comprise: for a sensory context, determining a first instance of a control output using a pre-configured and non-learning prediction process and a second instance of the control output using a learning prediction process; combining the first instance of the control output with the second instance of the control output using a combination process to produce the combined control output; and causing the task to be executed responsive to providing the combined control output to the robot. The learning prediction process may be configured to determine the second instance of the control output based on a teaching input indicative of a target trajectory associated with the task execution. Execution of the task by the robot in accordance with the combined control output may be configured to produce a trajectory that is closer to the target trajectory compared to task execution based on one or both of the first instance of the control output or the second instance of the control output.

In some implementations, the learning process may be configured to associate the sensory context with the target trajectory. The association may be based on updating a parameter of the learning process during based on a contemporaneous occurrence of the sensory context and the training input.

In some implementations, the robot may comprise a plurality of actuators characterized by a first operational degree of freedom and a second operational degree of freedom. The first instance of the control output may be configured for operating the first operational degree of freedom and the second instance of the control output is configured for operating the second operational degree of freedom. The combination process may comprise a concatenation operation.

Yet another aspect of the disclosure relates to a method of determining a control signal for a robot. The method may be performed by one or more processors executing instructions stored by a non-transitory computer-readable storage medium. The method may comprise: determining an occurrence of a first context in sensory input; accessing a learning process configuration, the learning process configuration adapted to convey an association between a given context and a respective action; determining a first action associated with the first context; responsive to the first action corresponding to a pre-programmed action, activating a pre-programmed predictor component to produce the control signal based on analysis of the sensory input; responsive to the first action corresponding to a learned action, activating a learning predictor component to produce the control signal based on analysis of the sensory input and a training input; and updating the learning process configuration in accordance with the activated component.

In some implementations, the robot may comprise an autonomous vehicle and a collector apparatus. The pre-programmed action may comprise an object search task configured based on a random exploration of environment by the robot. The learned action may comprise an object collection task configured based on a provision of the training input.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
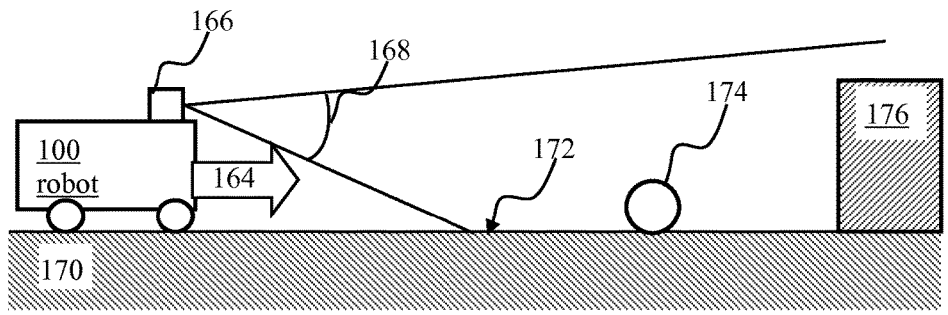
FIG. 1 is a graphical illustration depicting a robotic apparatus comprising an adaptive controller configured for autonomous navigation, in accordance with one or more implementations.

All Figures disclosed herein are © Copyright 2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation), USB (e.g., USB2), Ethernet (e.g., 10/100, 10/100/1000 (Gigabit Ethernet), 10-Gig-E, and/or other technologies), MoCA, Coaxsys (e.g., TVnet™), radio frequency tuner (e.g., in-band or OOB, cable modem, and/or other technologies), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

FIG. 1 depicts a mobile robotic apparatus 100 that may be configured with an adaptive controller in accordance with one or more implementations of e.g., the learning apparatuses illustrated in FIGS. 2-5, infra. The robotic apparatus 100 may comprise a sensor component 166. The sensor component 166 may be characterized by an aperture and/or field of view 168. Generally speaking, a field of view may be described as an extent of the observable world that may be captured by the sensor at a given moment. The sensor component 166 may provide information associated with objects within the field-of-view 168. In one or more implementations, such as object recognition, and/or obstacle avoidance, the output provided by the sensor component 166 may comprise a stream of pixel values associated with one or more digital images. In one or more implementations wherein the sensor 166 may comprise video, radar, sonography, x-ray, magnetic resonance imaging, and/or other types of sensors, the sensor output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values refreshed at a 25 Hz frame rate. In some implementations, the RGB image data may be augmented with range (visual scene depth) data to produce RGB-D frame. It will be appreciated by those skilled in the arts that the above image parameters are merely exemplary, and many other image representations (e.g., bitmap, CMYK, HSV, HSL, grayscale, and/or other representations) and/or frame rates may be utilized in various implementations of the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS", and issued as U.S. Pat. No. 8,467,623; U.S. Pat. No. 8,315,305, issued Nov. 20, 2012, and entitled "SYSTEMS AND METHODS FOR INVARIANT PULSE LATENCY CODING"; co-owned U.S. patent application Ser. No. 13/152,084, filed Jun. 2, 2011, and entitled "APPARATUS AND METHODS FOR PULSE-CODE INVARIANT OBJECT RECOGNITION", and issued as U.S. Pat. No. 9,405,975; and/or latency encoding comprising a temporal winner take all mechanism described in co-owned U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS", issued as U.S. Pat. No. 9,195,934 and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012, issued as U.S. Pat. No. 9,047,568, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", and issued as U.S. Pat. No. 9,367,798, the foregoing being incorporated herein by reference in its entirety. The term "continuous signal" may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, and issued as U.S. Pat. No. 9,213,937 each of the foregoing being incorporated herein by reference in its entirety.

In some implementations of robotic navigation in an arbitrary environment, the sensor component 166 may comprise a camera configured to provide an output comprising a plurality of digital image frames refreshed at, e.g., 25 Hz frame rate. Output of the sensor 166 in FIG. 1 may comprise representations of one or more objects (e.g., target 174, and/or obstacle 176). The sensor output may be processed by a feature detection apparatus, e.g., as described in co-owned U.S. patent application Ser. No. 14/542,391 entitled "FEATURE DETECTION APPARATUS AND METHODS FOR TRAINING OF ROBOTIC NAVIGATION", filed Nov. 14, 2014, incorporated supra. In one or more implementations of visual data processing, the features that may be detected in the sensory output may comprise one or more of representations (e.g., representations of objects, corner, edges, patches of texture, color, brightness, and/or other patterns that may be present in visual output), audio patterns (e.g., speech elements), and/or other persistent signal patterns that may be relevant to a given task. A given pattern and/or data item (e.g., representation of an orange fruit on a tree and/or time of day) may comprise a relevant feature for one task (e.g., harvesting of oranges) and may be ignored by other tasks (e.g., navigation around trees). Various feature detection methodologies may be applied to processing of the sensor output. In some implementations, the feature detection may be configured to implement one or more of a filter operation (e.g., orange mask to detect orange objects), a Radon transform edge detection, corner detection (e.g., using Harris operator), texture detection (e.g., using Laws masks), patterns of motion (e.g., using optical flow), and/or other methodologies.

Output of the feature detection may be utilized by the robot to perform a task. The tasks of the robot 100 may be configured based on a context. In one or more implementations, the context may comprise one or more of an occurrence of one or more features in the sensor output, one or more robot states, a state of the environment, environmental conditions, previous state information, and/or other information. Examples of a robot state may include one or more of location or motion information (e.g., position, orientation, speed, and/or other information), platform state or configuration (e.g., manipulator size, manipulator position, and/or other information), available power and/or other robot states. Examples of a state of the environment may include one or more of an object size, object location, and/or other states of the environment. Examples of environmental conditions may include information indicating whether there is one or more of wind, rain, and/or other environmental conditions. In some implementations, previous state information may be based on historic states of robot motions. The robotic apparatus 100 may be operated using an adaptive controller, e.g., such as described below with respect to FIGS. 2-5.

Figure 2:
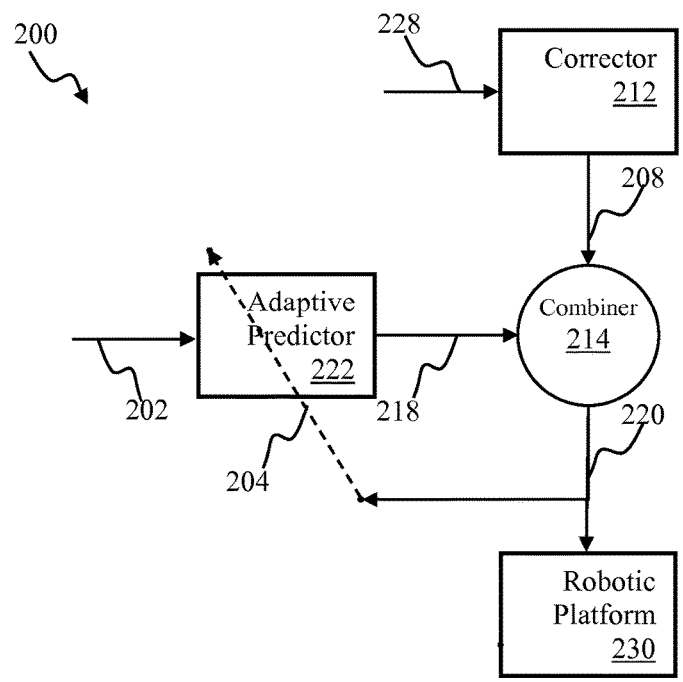
FIG. 2 is functional block diagram illustrating a robotic system comprising an adaptive predictor component, according to some implementations.
Figure 8:
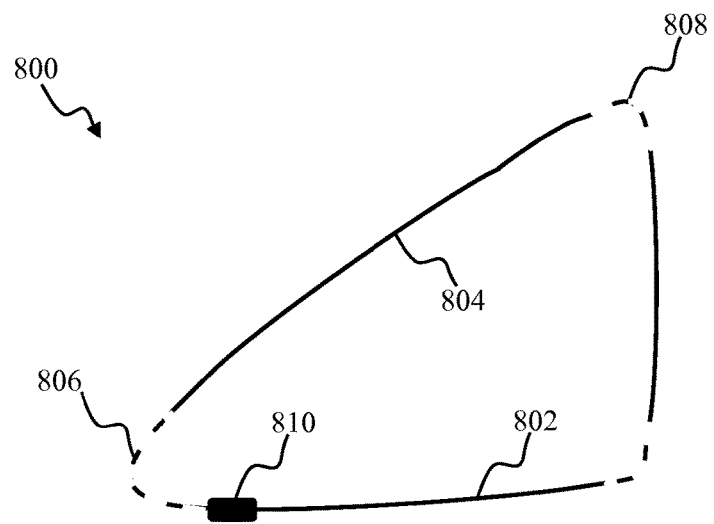
FIG. 8 is graphical illustration depicting navigation of an exemplary trajectory by a robotic vehicle configured for operation with the programming and training robotic control methodology of the disclosure, in accordance with one or more implementations

FIG. 2 illustrates an implementation of adaptive control system 200 for use with, e.g., the robotic apparatus 100 of FIG. 1 and/or 810 of FIG. 8. The adaptive control system 200 of FIG. 2 may comprise a corrector 212, an adaptive predictor 222, and a combiner 214 cooperating to control a robotic platform 230. The learning process of the adaptive predictor 222 may comprise one or more of a supervised learning process, a reinforcement learning process, an unsupervised learning process, and/or other processes. The corrector 212, the predictor 222, and the combiner 214 may cooperate to produce a control signal 220 for the robotic platform 230. In one or more implementations, the control signal 220 may comprise one or more motor commands (e.g., pan camera to the right, turn right wheel forward), sensor acquisition commands (e.g., use high resolution camera mode), and/or other commands.

In some implementations, the predictor 222 and the combiner 214 components may be configured to operate a plurality of robotic platforms. The control signal 220 may be adapted by a decoder component in accordance with a specific implementation of a given robotic platform 230. In one or more implementations of robotic vehicle control, the adaptation by the decoder may comprise translating binary signal representation 220 into one or more formats (e.g., pulse code modulation) that may be utilized by given robotic vehicle. Co-owned and co-pending U.S. patent application Ser. No. 14/244,890 entitled "APPARATUS AND METHODS FOR REMOTELY CONTROLLING ROBOTIC DEVICES", filed Apr. 3, 2014 describes some implementations of control signal conversion.

In some implementations of the decoder corresponding to the analog control and/or analog corrector 212 implementations, the decoder may be further configured to rescale the drive and/or steering signals to a range appropriate for the motors and/or actuators of the platform 230.

In some implementations of the discrete state space control implementation of the corrector 212, the decoder may be configured to convert an integer control index into a corresponding steering/drive command using, e.g. a lookup table approach described in detail in, e.g., co-owned U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, and issued as U.S. Pat. No. 9,346,167, ("the '113 application"), the foregoing being incorporated herein by reference in its entirety.

The corrector 212 may receive a control input 228 from a control entity. The control input 228 may be determined based on one or more of (i) sensory input 202 and (ii) feedback from the platform (not shown). In some implementations, the feedback may comprise proprioceptive signals. Examples of a proprioceptive signal may include one or more of feedback from servo motors, feedback from joint position sensors, torque resistance, and/or other proprioceptive signals. In some implementations, the sensory input 202 may correspond to the sensory input, described, e.g., with respect to FIG. 1, supra. In one or more implementations, the control entity providing the input 228 to the corrector may comprise a human trainer, communicating with the robot via a remote controller (wired and/or wireless). In some implementations, the control entity may comprise a computerized agent such as a multifunction adaptive controller operable using reinforcement and/or unsupervised learning and capable of training other robotic devices for one and/or multiple tasks. In one such implementation, the control entity and the corrector 212 may comprise a single computerized apparatus.

The corrector 212 may be operable to generate control signal 208 using a plurality of approaches. In some implementations of analog control for robotic vehicle navigation, the corrector output 208 may comprise target vehicle velocity and target vehicle steering angle. Such implementations may comprise an "override" functionality configured to cause the robotic platform 230 to execute action in accordance with the user-provided control signal instead of the predicted control signal.

In one or more implementations of analog correction provision for robotic vehicle navigation, the control signal 208 may comprise a correction to the target trajectory. The signals 208 may comprise a target "correction" to the current velocity and/or steering angle of the platform 230. In one such implementation, when the corrector output 208 comprises a zero signal (or substantially a null value), the platform 230 may continue its operation unaffected.

In some implementations of state space for vehicle navigation, the actions of the platform 230 may be encoded using, e.g., a 1-of-10 integer signal, where eight (8) states may be used to indicate 8 directions of motion (e.g., forward-left, forward, forward-right, left, right, back-left, back, back-right), one state may indicate "stay-still", and one state may indicate "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for vehicle navigation, the action space of the platform 230 may be represented as a 9-element state vector, e.g., as described in, e.g., the above referenced the '113 application. Individual elements of the state vector may indicate the probability of the platform being subjected to (i.e., controlled within) a given control state. In one such implementation, output 218 of the predictor 222 may be multiplied with the output 208 of the corrector 212 in order to determine probability of a given control state.

The adaptive predictor 222 may be configured to generate predicted control signal $u^P$ 218 based on one or more of (i) the sensory input 202 and the platform feedback (not shown). The predictor 222 may be configured to adapt its internal parameters, e.g., according to a supervised learning rule, and/or other machine learning rules.

Predictor realizations comprising platform feedback, may be employed in applications such as, for example, where: (i) the control action may comprise a sequence of purposefully timed commands (e.g., associated with approaching a stationary target (e.g., a cup) by a robotic manipulator arm), or where (ii) the platform may be characterized by platform state parameters (e.g., arm inertia, and/or motor response time) that change faster than the rate of action updates. Parameters of a subsequent command within the sequence may depend on the control plant state. A "control plant" may refer to the logical combination of the process being controlled and the actuator (often expressed mathematically).

For example, control plant feedback might be the exact location and/or position of the arm joints which can be provided to the predictor.

In some implementations, the predictor 222 may comprise a convolutional network configured to predict the output 220 of the combiner 214 given the input 202. The convolutional network may be combined with other components that learn to predict the corrector signal given other elements of the sensory context. When the corrector 212 output comprises a zero signal (or null value), the combiner output 220 may equal the predictor output 218. When the corrector provides a non-zero signal, a discrepancy may occur between the prediction 218 and the output 220 of the combiner 214. The discrepancy may be utilized by the predictor 222 in order to adjust parameters of the learning process in order to minimize future discrepancies during subsequent iterations.

The sensory input and/or the plant feedback may collectively be referred to as sensory context. The sensory context may be utilized by the predictor 222 to produce the predicted output 218. By way of a non-limiting illustration, one exemplary scenario of obstacle avoidance by an autonomous rover uses an image of an obstacle (e.g., wall representation in the sensory input 202) combined with rover motion (e.g., speed and/or direction) to generate Context_A. When the Context_A is encountered, the control output 220 may comprise one or more commands configured to avoid a collision between the rover and the obstacle. Based on one or more prior encounters of the Context_A avoidance control output, the predictor may build an association between these events as described in detail below.

The combiner 214 may implement a transfer function h(x) where x includes the control signal 208 and the predicted control signal 218. In some implementations, the combiner 214 operation may be expressed, e.g., as described in detail in co-owned and co-pending U.S. patent application Ser. No. 13/842,530 entitled "ADAPTIVE PREDICTOR APPARATUS AND METHODS", filed Mar. 15, 2013, as follows:

$$\hat{u}=h(u,u^P).\qquad\text{(Eqn. 1)}$$

Various realizations of the transfer function of Eqn. 1 may be utilized. In some implementations, the transfer function may comprise one or more of addition, multiplication, union, a logical 'AND' operation, a logical 'OR' operation, and/or other transfer functions.

In one or more implementations, the transfer function may comprise a convolution operation, e.g., a dot product. In spiking network realizations of the combiner function, the convolution operation may be supplemented by use of a finite support kernel (i.e., a mapping function for linear space to a non-linear space) such as Gaussian, rectangular, exponential, and/or other process. In some implementations, a finite support kernel may implement a low pass filtering operation of input spike train(s). In some implementations, the transfer function h may be characterized by a commutative property.

In one or more implementations, the transfer function of the combiner 214 may be configured as follows:

$$h(0,u^P)=u^P.\qquad\text{(Eqn. 2)}$$

In some implementations, the transfer function h may be configured as:

$$h(u,0)=u.\qquad\text{(Eqn. 3)}$$

In some implementations, the transfer function h may be configured as a combination of realizations of Eqn. 2-Eqn. 3 as:

$$h(0,u^P)=u^P,\text{ and }h(u,0)=u,\qquad\text{(Eqn. 4)}$$

In one exemplary implementation, the transfer function satisfying Eqn. 4 may be expressed as:

$$h(u,u^P)=(1-u)\times(1-u^P)-1.\qquad\text{(Eqn. 5)}$$

In one such realization, the combiner transfer function is configured according to Eqn. 2-Eqn. 5, to implement additive feedback. In other words, output of the predictor (e.g., 218) may be additively combined with the control signal (408) and the combined signal 220 may be used as the teaching input (404) for the predictor. In some implementations, the combined signal 220 may be utilized as an input (context) into the predictor 222, e.g., as described in co-owned and co-pending U.S. patent application Ser. No. 13/842,530 entitled "ADAPTIVE PREDICTOR APPARATUS AND METHODS", filed Mar. 15, 2013, incorporated supra.

In some implementations, the combiner transfer function may be characterized by a delay expressed as:

$$\hat{u}(t_{i+1})=h(u(t_i),u^P(t_i)),\qquad\text{(Eqn. 6)}$$

where $\hat{u}(t_{i+1})$ denotes combined output (e.g., 220 in FIG. 2) at time t+Δt.

As used herein, symbol $t_i$ may be used to refer to a time instance associated with individual controller update events (e.g., as expressed by Eqn. 6), for example $t_i$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

In some implementations, the combiner transfer function may be configured to implement override functionality (e.g., override combiner). The "override" combiner may detect a non-zero signal provided by the corrector, and provide a corrector signal as the combined output. When a zero (or no) corrector signal is detected, the predicted signal may be routed by the combiner as the output. In some implementations, the zero corrector signal may be selected as not a value (NaN); the non-zero signal may comprise a signal rather than the NaN.

In one or more implementations of a multi-channel controller, the corrector may simultaneously provide "no" signal on some channels and one or more signals on other channels, allowing the user to control one degree of freedom (DOF) of the robotic platform while the predictor may control another DOF.

It will be appreciated by those skilled in the art that various other realizations of the transfer function of the combiner 214 may be applicable. For example, in some implementations, the transfer function may include a Heaviside step function, a sigmoid function (e.g., hyperbolic tangent), Gauss error function, logistic function, a stochastic operation, and/or other transfer functions. Operation of the predictor 222 learning process may be aided by a teaching signal 204. As shown in FIG. 2, the teaching signal 204 may comprise the output 220 of the combiner 214. In some implementations wherein the combiner transfer function may be characterized by a delay (e.g., Eqn. 6), the teaching signal at time $t$, may be configured based on values of u, $u^P$ at a prior time $t_{i-1}$, for example as:

$$u^d(t_i)=h(u(t_{i-1}),u^P(t_{i-1})).\qquad\text{(Eqn. 7)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_1$:

$$u^P(t_{i+1})=F[x_i,W(u^d(t_i))].$$ (Eqn. 8)

In Eqn. 8, the function W may refer to a learning process implemented by the predictor, e.g., a perceptron, and/or a look-up table.

In one or more implementations, such as illustrated in FIG. 2, the sensory input 206, the control signal 208, the predicted output 218, the combined output 220 and/or plant feedback may comprise spiking signals, analog signals, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, and issued as U.S. Pat. No. 9,213,937, incorporated supra.

Output 220 of the combiner e.g., 214 in FIG. 2 may be gated. In some implementations, the gating information may be provided to the combiner by the corrector 212 using, e.g., an "override" indication in order to cause the robotic platform 230 to execute actions according to the user-provided control instead of the predicted control signal.

In one such realization of spiking controller output, the control signal 208 may comprise positive spikes indicative of a control command. The control signal 208 may be configured to be combined with the predicted control signal (e.g., 218). The control signal 208 may comprise negative spikes. The timing of the negative spikes may be configured to communicate the control command. The (negative) amplitude sign may be configured to communicate the combination inhibition information to the combiner 214 to enable the combiner to 'ignore' the predicted control signal 218 for constructing the combined output 220.

In some implementations of spiking signal output, the combiner 214 may comprise a spiking neuron network. The control signal 208 may be communicated via two or more connections. One such connection may be configured to communicate spikes indicative of a control command to the combiner neuron. The other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 220 in FIG. 2).

The gating information may be provided to the combiner by another entity (e.g., a human operator controlling the system with a remote control and/or external controller) and/or from another output from the corrector 212 (e.g., an adaptation block, an optimization controller). In one or more implementations, the gating information may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 220) to be comprised solely of the control signal portion 218, e.g., configured in accordance with Eqn. 3. In one or more implementations the gating information may be used to suppress (veto') provision of the context signal to the predictor without affecting the combiner output 220. In one or more implementations, the gating information may be used to suppress (veto') the feedback from the platform.

In one or more implementations, the gating signal may comprise an inhibitory indication that may be configured to inhibit the output from the combiner. Zero combiner output may, in some realizations, may cause zero teaching signal (e.g., 214 in FIG. 2) to be provided to the predictor so as to signal to the predictor a discrepancy between the target action (e.g., controller output 208) and the predicted control signal (e.g., output 218).

The gating signal may be used to veto predictor output 218 based on, for example, the predicted control output 218 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (e.g., due to a trajectory change and/or sensory input change), and the predictor output still produces turn instructions to the plant, the gating signal may cause the combiner to veto (ignore) the predictor contribution and pass through the controller contribution.

Predicted control signal 218 and the control input 208 may be of opposite signs. In one or more implementations, a positive predicted control signal (e.g., 218) may exceed the target output that may be appropriate for performance of as task. The control signal 208 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (compared to the predictor learning time scale caused by e.g., appearance of a new obstacle, target disappearance), may require an "override" capability for the controller (and/or supervisor) to 'override' predictor output. In one or more implementations compensation for over-prediction may be controlled by a graded form of the gating signal.

Figure 3:
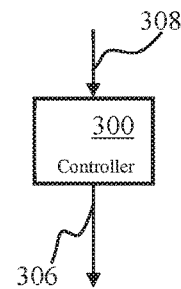
FIG. 3 is a block diagram illustrating an unattended robotic controller configured to determine a control output based on sensory input, according to one or more implementations.

FIG. 3 illustrates an unattended robotic controller apparatus configured to determine a control output based on sensory input, according to one or more implementations. The apparatus 300 of FIG. 3 may operate an unsupervised control process configured based on software application (programmed), a learned configuration (e.g., table and/or array of weights determined during training), and/or other control process operable without training input from human and/or computerized training entity.

The apparatus 300 may be configured to receive context 308 and to produce control output 306. In one or more implementations, the context 308 may comprise sensory input, e.g., 202, described above with respect to FIG. 2. The output 306 may comprise one or more of motor commands (e.g., voltage, force, torque, represented as discrete and/or continuous values), action indications, e.g., as described in Ser. No. 13/842,616 entitled "ROBOTIC APPARATUS AND METHODS FOR DEVELOPING A HIERARCHY OF MOTOR PRIMITIVES", filed Mar. 15, 2013, the foregoing being incorporated herein by reference in its entirety. The term "action indication" may be used to describe an instruction, a memory value, a signal, and/or another indication mechanism configured to convey a higher level control directive. The higher level control directive may not be directly communicated to the motor but rather may serve as an action directive to another component of the control system (e.g., the predictor 222 and/or a combiner 214 in FIG. 2). In one or more implementations, the action indication may comprise, for example, a directive. Examples of a directive may include one or more of "turn", "move ahead", "turn left", "turn right", and/or other directives. In some implementations, the control system may utilize a hierarchy of action indications, ranging from less complex/more specific (e.g., turn, move) to more abstract: approach, avoid, fetch, park, grab, and/or other instructions.

In some implementations, training a predictor (e.g., 222) to produce a control output may be combined with a predictor operating using an unattended (e.g., programmed, pre-trained) process (e.g., the component 300) in a hybrid control process. The unattended (e.g., programmed, pre-trained) process may also be referred to as a "reflex".

Figure 4A:
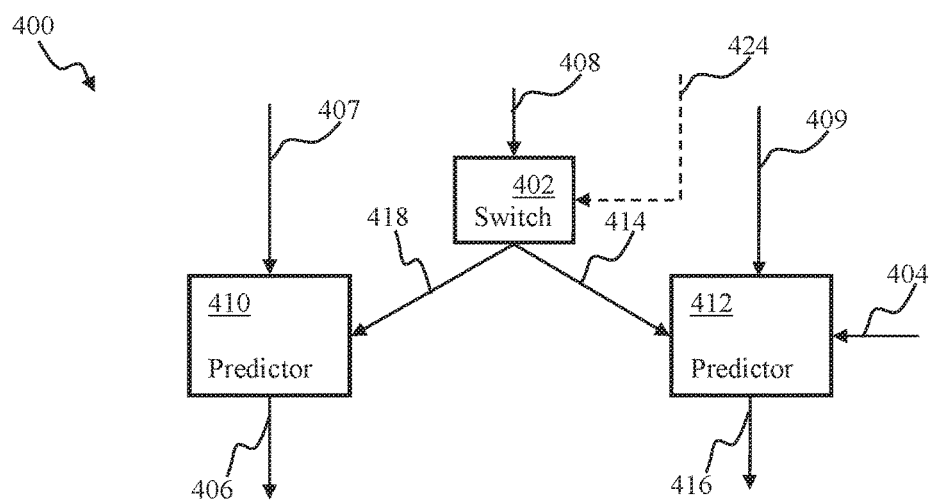
FIG. 4A is a block diagram illustrating a hybrid controller apparatus comprising a switching component, according to one or more implementations.

FIG. 4A illustrates use of a hybrid control methodology with a robotic controller apparatus configured to determine a control output based on sensory input, according to one or more implementations. Apparatus 400 of FIG. 4A may comprise a switching component 402 coupled to predictor components 410, 412. The components 402, 410, 412 may be configured to receive sensory information 407, 408, 409, respectively. In one or more implementations, the sensory input 407, 408, 409 may comprise all or a portion of sensory information available to the apparatus 400. In some implementations, the sensory information may comprise, e.g., the input 202 described above with respect to FIG. 2. By way of an illustration, the sensory input 407, 408, 409 may comprise data from one or more sensors (audio, video, range, acoustic, IR, structured light, LiDAR, radio frequency, positioning, inertial, environmental, and/or other sensors) characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight), inputs from appliances such as valves, doors, locks, light switches, light fixture status, entertainment components, and/or other data. In some implementations, the sensory data may comprise pre-processed data e.g., edges, color patches obtained from camera data, platform speed, tilt obtained from inertial measurements, and/or other processed data.

In one or more implementations, individual ones of the sensory inputs 407, 408, 409 may be configured different from one another, e.g., comprising a subset of the available sensory information. By way of an illustration of target search and manipulation application, a robotic platform may comprise a navigation sensor (e.g., camera, LiDAR, ultrasonic range sensor, and/or other navigation sensor) configured to provide information to a navigation component (e.g., pre-programmed predictor 410) used to operate the platform during path following, target search, and/or target approach task. The platform may further comprise a manipulator supporting another sensor (e.g., gripper mounted camera) useful for providing sensory information to a learning predictor for grasping the target. The information 407 may comprise navigation sensor output. The information 409 may comprise data provided by the gripper camera, position, and/or orientation of the manipulator, and/or other information.

Predictor components 410, 412 may be configured to determine control output (406, 416, respectively) based on the sensory input (407, 409, respectively). The predictor component 410 may be configured to operate an unattended control process, e.g., comprising a programmed, a pre-trained and/or otherwise configured process that may be operable without input from a trainer, e.g., random exploration based on visual input; obstacle avoidance based on distance sensor and visual input as described above with respect to FIG. 3.

In some implementations of self-stabilized camera support, the predictor component 410 may be configured to implement a stabilization behavior wherein a camera module mounted on an arm is stabilized (e.g., kept pointing in a given direction at a given elevation). The component 410 may be configured to produce control output for joints of the arm in order to maintain camera orientation.

The predictor component 412 may be configured to operate a learning control process configured based on a teaching signal 404 from an external (e.g., with respect to the entity 412). In some implementations, the component 412 may comprise the adaptive predictor 222 described above with respect to FIG. 2. The teaching input may comprise an output of a combiner component (e.g., the output 204 in FIG. 2) configured based on a training input (208 in FIG. 2). In one or more implementations of robotic vehicle navigation, the training signal 404 may comprise target vehicle velocity and/or target vehicle steering angle. Such implementations may comprise an "override" functionality configured to cause a robot to execute action in accordance with the trainer-provided control signal instead of the predicted control signal. In some implementations, the training signal 404 may comprise a correction (an increment/decrement) to vehicle velocity and/or direction, and/or other parameters.

In some implementations, the training signal 404 may comprise desired motor velocity for motors operating a robotic arm while training a controller to lift the arm once an object is in the gripper. In one or more implementations of training a Baxter robot (available from Rethink Robotics™), the training signal may comprise a 7 dimensional vector consisting of target position and/or velocity of the motors for operating joints of the Baxter arm. Velocity information may be used as the training signal when the Baxter arm needs to be rotated relative to the direction of a target object that the arm gripper is about to pick up.

Figure 4B:
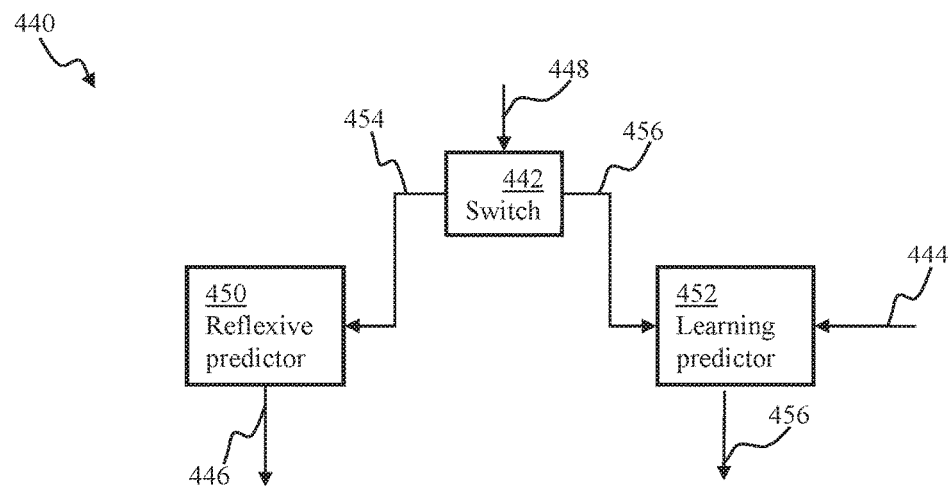
FIG. 4B is a block diagram illustrating a hybrid robotic controller apparatus comprising input switching, according to one or more implementations.
Figure 4C:
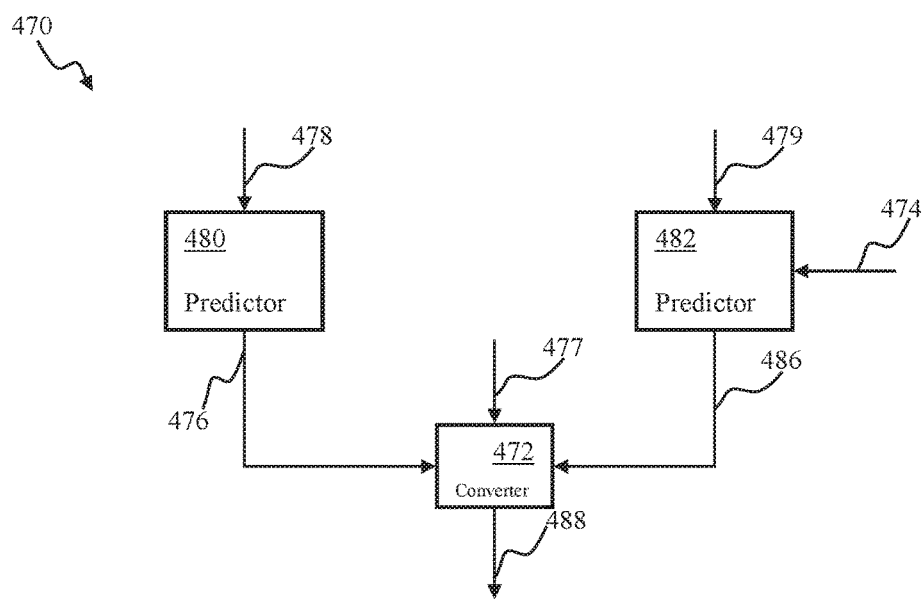
FIG. 4C is a block diagram illustrating a hybrid robotic controller apparatus comprising output switching, according to one or more implementations.

The controller configuration comprising a trained and an unattended predictor components (e.g., as illustrated in FIGS. 4A-4C) may be referred to as the hybrid controller and/or hybrid configuration.

FIG. 8 illustrates use of a hybrid control approach for controlling navigation of trajectory by a robotic vehicle. In FIG. 8, the robotic vehicle 810 may be configured to follow the trajectory 800. The trajectory 800 may comprise one or more straightaway portions (802, 804) and one or more turns (806, 808). The vehicle 810 may comprise a hybrid controller, e.g., 400 shown and described with respect to FIG. 4A. The vehicle 810 may comprise one or more sensors configured to communicate information related to vehicle position (e.g., with respect to the track), vehicle motion (e.g., orientation, velocity, acceleration), wheel traction, wheel position, brake status, motor speed, torque, and/or other parameters.

By way of an illustration, in one or more implementations, the predictor component 410 of apparatus 400 may be configured to provide one or more control signals to navigate the vehicle 810 along a straight portions (e.g., segments 802, 804) of the trajectory 800 in FIG. 8). Output 406 of the predictor 410 may be configured based on sensory input 407 (e.g., vehicle speed, position, and/or other parameters).

The predictor component 412 may be configured to provide one or more control signals to navigate a robotic vehicle (e.g., 100 in FIG. 1 and/or 810 in FIG. 8) along turns (e.g., segments 806, 808 of the trajectory 800 in FIG. 8). Output 416 of the predictor 412 may be configured based on the sensory input 409 and the training input 404. In one or more implementations, the training input 404 may comprise indication from the trainer to slow down, speed up, wheel orientation, and/or other navigation instructions.

In some implementations, the predictor component 410 may be configured to enable navigation of an exemplary trajectory by the vehicle 810 at a given speed based on a pre-programmed navigation controller provided by, e.g., a manufacturer of the vehicle 810. The predictor component 412 may be configured to be trained by a user to navigate the vehicle 810 along the trajectory in a shorter time and/or with smaller deviations from the trajectory. It will be appreciated by those skilled in the arts that above examples of operating predictors 410, 412 are exemplary and various other applications may be employed, such as, refuse location and pickup.

The switching component 402 may be configured to determine controller mode of operation, (e.g., the reflexive predictor 410 or the learning predictor 412). Operation of the switching component may be configured based on the sensory input 408. In some implementations, the sensory input 408 may comprise all or a portion of sensory input 407, 409 provided to the predictor components 410, 412. By way of illustration of one such implementation of a robotic manipulator operable to replace a light bulb, the switching component may enable a user to operate the learning predictor 412 in order to provide control signal 416 for approaching the light bulb with the grasping component of the manipulator. The switching component 402 may utilize visual, position, and/or other sensors in order to determine location of the grasping component relative the light bulb. Upon the grasping component being proximate the light bulb, the switching component 402 may select the reflex predictor 410 in order to provide control signal 404 for grasping the light bulb with the grasping component of the manipulator.

The switching component 402 may be configured based on a fixed (e.g., non-learning) process and/or a learning process. In some implementations, the component 402 process may comprise one or more of a pre-programmed process, a previously trained process, a pre-configured adaptive process (e.g., Kalman filter), a learning process (e.g., using one or more of supervised, reinforcement learning approaches), and/or other processes.

In one or more implementations of a pre-programmed switcher 402, the switching operation may be configured based on an input from a proximity sensor. The component 410 may be activated responsive to the proximity input (e.g. distance to an object) breaching a threshold; the component 412 may be activated otherwise.

By way of an illustration of target location and pick up application, switching component may be used to select between search and grasp behaviors. The search behavior may be configured based on a pre-configured process (e.g., component 410) wherein the robot may randomly explore the environment in order to locate target(s). The component 412 may be user to learn approach and grasp behavior. The switching operation may be effectuated based on visual input wherein the pre-programmed (random exploration) behavior may be executed if a target is not visible (in visual field). Trained behavior (approach and grasp target) may be executed if target is visible. The switching component 402 may be operable in accordance with learning or programmed process.

In some implementations, operation of the component 402 may be configured based on a learning process. The learning process may be configured based on the training input 424. By way of an illustration of a refuse collection application by an autonomous robot comprising a manipulator, the training input may comprise an image of an object (e.g., a piece of refuse) in the manipulator griper. Upon detecting a presence of the object in the gripper, the switching component 402 may learn to select a pre-trained "deliver to base" behavior (e.g., component 410), wherein the object may be placed in to a basket and/or the robot may navigate to the basket (base). In absence of the object in the gripper, the component 402 may select learning behavior (e.g., component 412) wherein the component 412 object may be trained to grasp a target.

In some implementations, training input 424 maybe the output of a target tracker, where the output comprises an (x,y) coordinate representing location of a target object in the visual space. The switching component 402 may be trained to switch based on the location of the target object (e.g., if close-by in front, then perform grasping; if far in the visual field, then approach; if target not in the visual field, then search, end/or other implementations).

In one or more implementations, the input 408 into the switching component 402 may comprise input distinct from the inputs 407, 409. By way of an illustration, wherein the apparatus 400 functionality may be embodied within a portable battery-operated device characterized by limited computational and/or energy (e.g., battery), the switching component 402 may select operation of the apparatus 400 based on the reflexive predictor 410. In some implementations, operating the reflexive predictor may be characterized by lower energy use compared to the learning predictor (e.g., due to fewer computations being performed). Accordingly, selection of the predictor 410 by the switching component 402 may extend autonomous operation of a battery powered device being controlled by the controller apparatus 400. The apparatus 400 may be embodied in a device comprising sufficient energy resource for operating learning predictor component 412 and/or used in an application that may benefit from training (e.g., visual based path following with obstacle avoidance in a novel environment where the newness of the environment makes it difficult to pre-program the desired behavior). The apparatus 400 may be embodied in a toy-animator where a child may train an inexpensive IR and/or radio controlled toy to perform a target action that has not been previously programmed into the toy, but trained by the child (e.g., training of a ball fetch behavior, and/or other behaviors). The switching component 402 may select operation of the component 412. The input 408 may comprise platform configuration (e.g., battery powered), current energy use, remaining energy, and/or other parameters.

The selection of the components 412, 410 may be effectuated based on indications 414, 418 respectively. In one or more implementations, the indications 414, 418 may comprise a message, a logic state (e.g., ON/OFF, HI/LO and/or other), a value in a register, a continuous valued signal (e.g., voltage), a spike, a pulse, a code, and/or other method of communicating state information.

In some implementations, the component 410 may be configured to operate a pre-programmed process configured for random exploration of an environment by a robotic device (e.g., the apparatus 100 in FIG. 1). The component 412 may be configured to operate a learning target approach process, e.g., as described in co-owned U.S. patent application Ser. No. 13/928,775, filed Jun. 27, 2013 and entitled "ACTION SELECTION APPARATUS AND METHODS", the foregoing being incorporated herein by reference in its entirety. The switching component 202 may enable the robotic device to execute the exploration behavior (by the component 410) when target (e.g., 174 in FIG. 1) is not being detected and/or present in the sensory data; once the target is detected, the switching component may switch to execution of the target approach by the component 412.

In one or more implementations of a target collection behavior (e.g., trash collecting robot, security robot and/or other), the robot may be configured to search for, approach, and/or grasp one or more targets. The component 410 may be configured to enable random exploration of the environment. The component 412 may be configured to learn target approach and/or grasp behaviors. Operation of the switching component 402 may be configured based on visual input. Responsive to determining that the target is not present (in visual field). The component 402 may produce indication 418 configured to cause the apparatus 400 to execute exploration behavior. Responsive to determining that the target is present, the component 402 may produce indication 416 configured to cause the apparatus 400 to execute approach/grasp behavior. The decision making by the component 402 may be either based on a learning process and/or on a pre-programmed process.

In one implementation of memoryless switching process, the switching determination may be performed when a new input 408 may arrive to the component 402 independently of the previous decision.

In some implementations, the switching component 402 may be trained to produce output 418, 414 or to maintain a prior selection. By way of an illustration, if, for an input 408 at time T, the switching component indicates 'no change', then the component 402 output may remain assigned to the output obtained at time T−1<T.

In one or more implementations, the switching output at time T may be configured (biased by) based on the prior selections. Such bias may be implemented using an increasing and decaying temporal component as follows:
  baseline probability of selecting the output 418 is equal to probability of selecting the output 414;
  if for an input at time T the output 418 may be selected, then probability p(418) of selecting the output 418 may be increased;
  selection probabilities p(418) and p(414) may decay back to their baseline, e.g., following an exponential decay of a half-life of tau;
  at a given time T decision whether to route/select 418 or 414 may be configured based on the input 408 and current values of the probabilities p(418), and p(414).

The time constant tau may be configured to determine time scale for the bias. In some implementations of navigating a household robotic vacuum at speeds between 0.1 m/s and 2 m/s, the bias timescale may be selected between 0.1 s and 1 s.

In some implementation, the switching process of the component 402 may be configured to determine confidence information (e.g., percent good). High confidence may be configured override bias information. Lower confidence may be used to be combined with bias values p(418) and p(414) to make a probabilistic selection.

In some implementations, a robotic vacuum cleaner may be configured to perform vacuuming operation of the environment while following a given path. The robotic vacuum cleaner may be configured to approach and engage to a docking/charging station when the station is available and/or the robot battery may be below a threshold (e.g., voltage below 12.5 V for 14.4 V battery, remaining charge is below 15% level, and/or other condition).

The component 402 may be configured to monitor battery voltage and/or detect a charging station. Upon detecting a target condition (e.g., low voltage and/or charging station in a proximity of 3 m), the component 402 may produce the indication 418 configured to cause the apparatus 400 to execute approach and dock behavior in order to charge the battery of the robotic vacuum. In some implementations, the charging station detection may be configured based on analysis by the component 402 of video signal obtained by the robotic vacuum, and/or a beacon signal of the docking station (e.g., RF, ultrasonic, IR and/or other signal).

When in vacuum mode of operation, the component 402 may be configured to select trained behavior via the indication 414 thereby causing the robotic vacuum to cover area of the environment using, e.g., a given pattern (e.g., cornrow). The component 402 may be configured using a preprogrammed process.

FIG. 4B illustrates a hybrid robotic controller apparatus comprising input switching, according to one or more implementations. Apparatus 440 of FIG. 4B may comprise a switching component 442 coupled to predictor components 450, 452. The component 442 may be configured to receive sensory information 448. In one or more implementations, the sensory input 448 may comprise, e.g., the input 202 described above with respect to FIG. 2 and/or sensory input described above with respect to FIG. 1, and/or FIG. 4A.

The switching component 442 may be configured to determine mode of operation, (e.g., the reflexive predictor 450 or the learning predictor 452) of the controller 440. Operation of the switching component 442 may be configured based on the sensory input 448. In some implementations, the sensory input 448 may comprise information related to configuration of a robotic device being controlled by the apparatus 440. By way of an illustration wherein the controller 440 functionality may be embodied within a portable battery-operated device characterized by limited computational and/or energy (e.g., battery), the switching component 442 may select operation of the controller 440 based on the reflexive predictor 450. In some implementations, operating the reflexive predictor may be characterized by lower energy use compared to the learning predictor (e.g., due to fewer computations being performed). Accordingly, selection of the predictor 450 by the switching component 442 may extend autonomous operation of a battery powered device being controlled by the controller apparatus 440. When the controller 440 may be embodied in a device comprising sufficient energy resource for operating learning predictor component 452 and/or used in an application that may benefit from training, the switching component 442 may select operation of the component 452. Responsive to selecting component 450 or 452, the switching component 442 may route the sensory input 448 to the respective component (e.g., 450, 452) via pathways 454, 456, respectively). In one or more implementations, information provided via pathways 454, 456 may comprise one or more subsets of the input 448.

Predictor components 450, 452 may be configured to determine control output (446, 456, respectively) based on the sensory input (454, 456, respectively). The predictor component 450 may be configured to operate an unattended control process, e.g., such as described above with respect to FIGS. 3-4A.

The predictor component 452 may be configured to operate a learning control process configured based on a training signal 444 from an external (e.g., with respect to the entity 452). In some implementations, the component 412 may comprise the adaptive predictor 222 and/or 412 described above with respect to FIGS. 2 and/or 4A. The teaching input 444 may comprise an output of a combiner component (e.g., the output 204 in FIG. 2) configured based on a training input (208 in FIG. 2). In one or more implementations of robotic vehicle navigation, the training signal 444 may comprise target vehicle velocity and/or target vehicle steering angle.

FIG. 4C illustrates a hybrid robotic controller comprising control output switching, according to one or more implementations. Apparatus 470 of FIG. 4C may comprise a converter component 472 coupled to predictor components 480, 482. The components 472, 480, 482 may be configured to receive sensory information 477, 478, 479, respectively. In one or more implementations, the sensory input 477, 478, 479 may comprise all or a portion of sensory information available to the apparatus 470. In some implementations, the sensory information may comprise, e.g., the input 202 described above with respect to FIG. 2. By way of an illustration, the sensory input 477, 478, 479 may comprise data from one or more sensors (audio, video, range, acoustic, IR, structured light, LiDAR, radio frequency, positioning, inertial, environmental, and/or other sensors) characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight), inputs from appliances such as valves, doors, locks, light switches, light fixture status, entertainment components, and/or other data. In some implementations, the sensory data may comprise pre-processed data e.g., edges, color patches obtained from camera data, platform speed, tilt obtained from inertial measurements, and/or other processed data. In some implementations, the sensory information (e.g., 477) may comprise information related to configuration of a robotic device (e.g. battery operated) being operated by the apparatus 470 and/or information related to task being performed (e.g., target approach, obstacle avoidance, and/or other tasks).

In one or more implementations, individual ones of the sensory inputs 477, 478, 479 may be configured different from one another, e.g., comprising a subset of the available sensory information, e.g., such as described with respect to FIG. 4A above. By way of an illustration of operating a mobile platform comprising a manipulator, the input 478 may comprise gripper camera input. The process 480 may be configured to provide data to motors controlling the gripper. The input 479 may comprise LiDAR output and forward facing camera output. The component 482 may provide output for controlling motors that propel the platform (e.g. the wheels or tank-threads).

Predictor components 480, 482 may be configured to determine control output (476, 486, respectively) based on the sensory input (478, 479, respectively). The predictor component 480 may be configured to operate an unattended control process, e.g., comprising a programmed, a pre-trained and/or otherwise pre-configured process that may be operable without input from a trainer, e.g., as described above with respect to FIG. 3.

The predictor component 482 may be configured to operate a learning control process configured based on a teaching signal 474 from an external source (e.g., with respect to the entity 482). In some implementations, the component 412 may comprise the adaptive predictor 222 described above with respect to FIG. 2. The teaching input 474 may comprise an output of a combiner component (e.g., the output 204 in FIG. 2) configured based on a training input (208 in FIG. 2) and predictor output (218 in FIG. 2). In one or more implementations of robotic vehicle navigation, the training signal 474 may comprise target vehicle velocity and/or target vehicle steering angle. In such implementations the combiner (214 in FIG. 2) and the training input (208 in FIG. 2) may be configured such that the training input may comprise an "override" information configured to cause the robotic platform (e.g., 230 in FIG. 2) to execute action in accordance with the trainer-provided control signal (e.g., 208) rather than with the predicted control signal (e.g., 218). In some implementations, the training signal 474 in FIG. 4C may comprise a correction (an increment/decrement) to vehicle velocity and/or direction, and/or other parameters). Such additive (increments/decrements) maybe be combined with predictor output (218 in FIG. 2) in the combiner (214 in FIG. 2), which then provides commands (signal 220 in FIG. 2) to robotic body (230 in FIG. 2). In some implementations, training signal may consist of desired position of a multi joined arm (e.g., on a Baxter robotic platform). In some implementations, training signal may consist of desired speed of a wheeled robot (e.g., in the salmon algorithm the direction/orientation of the robot is determined based on programmed behavior, but the speed is trained).

Output 476, 486 of the predictor components 480, 482 may be provided to the converter component 472. Operation of the component 472 may be based on a pre-configured or learning process, e.g., as described above with respect to the switching component 402, 442 of FIGS. 4A-4B. In some implementations, the component 472 may be configured to produce output 488 based on a selection of one of the inputs 476, 486.

Predicted outputs 476, 486 may comprise confidence information and a motor control information. The component 472 may be configured to select the output 488 based on the motor control information (e.g., 476 or 486) characterized by higher confidence.

In some implementations, the component 472 may be configured to sample (e.g., a value from one the predicted outputs 476, 486) with the probability defined by the confidence signal associated with the outputs 476, 486, respectively.

In some implementations the component 472 may be configured determine the output 488 by determining a distributions of the predicted outputs (476, 486) and the output 488 over a time window. For a given current predictor output (e.g., 476 or 486), the probability/likelihood that the output is coming from one of the distributions is calculated. The respective probability may be used to determine the prediction confidence.

In some implementations, the component 472 may be configured to combine the predicted outputs 476, 486 in order to produce the output 488. Various combination implementations may be utilized, e.g., a mean, a weighted average using normalized prediction confidence such as:

$$\text{output\_488} = \text{confidence\_476} \times \text{value\_476} + \text{confidence\_486} \times \text{value\_486}, \quad \text{(Eqn. 9)}$$

where
confidence_of_{476, 486} may be configured in a range from 0 to 1, inclusive; and
confidence_of_476+confidence_of_486=1.

In one or more implementations, the component 472 may be configured to produce the output 488 based on a combination (e.g., a concatenation) of the inputs 476, 486. By way of an illustration of operating a robotic device characterized by a plurality operational degrees of freedom (DOF), output 476 may comprise control signal configured to operate a portion of the DOF (e.g., an actuator controlling forward/backward motion of a vehicle), the output 484 may comprise control signal configured to operate another portion of the DOF (e.g., an actuator controlling left/right motion of the vehicle). The component 480 may be configured to selectively combine the data streams 474, 484 to produce the output 488. In some implementations of reduced degree of freedom operation, the output 488 may be configured based on one of the data streams 474 or 484, e.g., as described in detail in co-owned and co-pending U.S. patent application Ser. No. 14/070,239 "REDUCED DEGREE OF FREEDOM ROBOTIC CONTROLLER APPARATUS AND METHODS", filed Nov. 1, 2013, and/or co-owned and co-pending U.S. patent application Ser. No. 14/070,269 "APPARATUS AND METHODS FOR OPERATING ROBOTIC DEVICES USING SELECTIVE STATE SPACE TRAINING", filed Nov. 1, 2013, incorporated supra.

Figure 10:
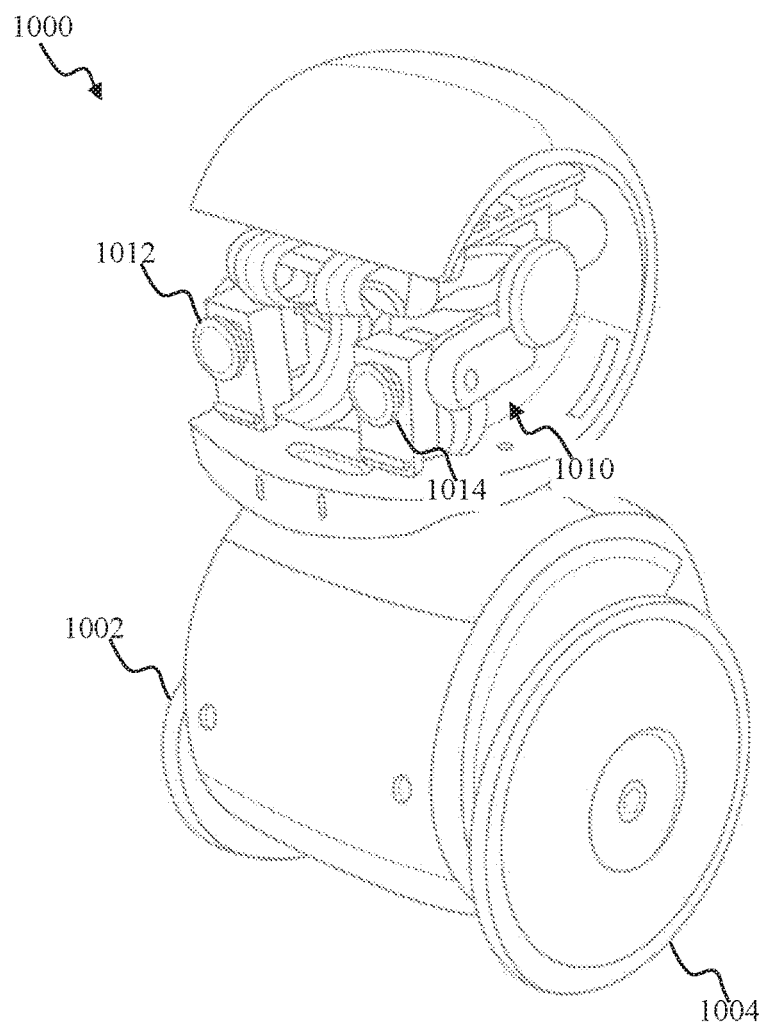
FIG. 10 is an isometric view of EyeRover™ robotic apparatus comprising articulated camera component and configured for use with the programming and training robotic control methodology of the disclosure, in accordance with one or more implementations.
Figure 11:
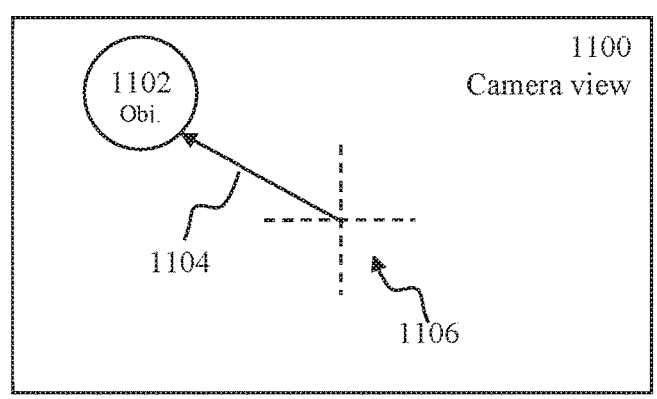
FIG. 11 is graphical illustration depicting target following by, e.g., camera of the EyeRover™ apparatus of FIG. 10, in accordance with one or more implementations.

Control signal generation methodology described above with respect to FIG. 4C may be employed in a variety of applications wherein some operations (behaviors) of a robotic device may be pre-programmed while other operations may be trained. By way of an illustration of a EyeRover™ robotic apparatus operation produced by Brain Corporation (see, e.g., description in BrainCorporationEyeRoverUserGuide.pdf). The EyeRover™ robotic apparatus, illustrated in FIG. 10, comprises motorized wheels 1002, 1004 and a motorized camera component 1010. The motorized camera component 1010 comprises actuators that may move a pair of cameras 1012, 1014 in two dimensions. The camera component may be configured to track an object and/or a person of interest (salient object). In some implementations, the salient object may comprise a person, a target (e.g., a ball, an enemy combatant), a vehicle, and/or other object/person. In some implementations, controller of the camera component 1010 may be operable in accordance with a pre-programmed algorithm configured to position the camera center of view (shown by cross hatch pattern 1106 in FIG. 11) at the object of interest (1102 in FIG. 11). The component 1010 controller may receive coordinates of the target 1102. The controller may operate the pre-programmed predictor component (e.g., 480 in FIG. 4C) to execute camera displacement operation illustrated by vector 1104 in FIG. 11). The EyeRover™ 1000 may comprise wheel controller component (e.g., the component 482) operable in accordance with a learning process. During tracking of a target (e.g., the ball 1102 in FIG. 11), the learning predictor may be trained to displace the EyeRover™ follow the target. The pre-programmed predictor may be configured to automatically adjust camera view vector to place the target at the center of view 1100 of the camera.

In some implementations, the camera component controller may be operable using a learning predictor process (e.g., 482) to follow an object of interest. The motorized wheels 1002, 1004 may be controlled by a pre-programmed predictor (480) to implement reflexive behavior to orient the EyeRover™ in a direction of the camera viewpoint (gaze).

In some implementations of a manipulator comprising two motorized joints, one joint may be controlled by a learning predictor (e.g., 482) while the other joint may be operated by a pre-programmed and/or pre-trained predictor (e.g., 480). By way of an illustration, the manipulator may support a camera and may be operable to maintain the camera pointing at a given location. One motorized joint of the manipulator may be operable using a learning predictor (e.g., 482) to adjust the manipulator in a first DOF. The other motorized joint may be operable by a pre-programmed and/or preconfigured predictor configured to automatically adjust camera orientation in order to maintain camera viewpoint.

In some implementations, the predicted control output 476, 486 of the components 480, 482 may comprise control signal designated for a given motor actuator. The predicted control output 476, 486 may comprise information related to quality of the motor control prediction. In one or more implementations, the prediction quality information may comprise variance of the predicted control signal determined over a given interval, confidence level (e.g., percentage), and or other measures. The component 472 may be configured to evaluate quality of predictions 476, 486. Based on determining that one prediction may be characterized by greater confidence (e.g., lower variance) the component 472 may select the respective signal as the output 488. In some implementations of controlling multiple DOF, the prediction quality evaluation may be configured on a component by component basis so that one or more DOF of the output 488 may be selected from prediction 476 while other DOF may be selected from prediction 486.

Figure 5A:
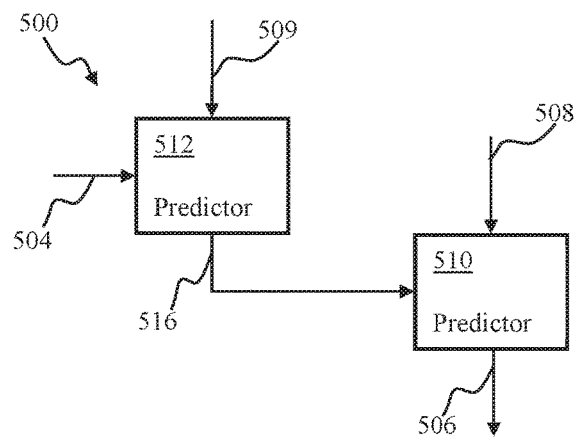
FIG. 5A is a block diagram illustrating a control apparatus comprising two cascaded predictors configured to determine a control output based on sensory input, according to one or more implementations.

FIG. 5A illustrates a control apparatus comprising two cascaded predictor components configured to determine a control output based on sensory input, according to one or more implementations.

The apparatus 500 in FIG. 5A may comprise predictor components 510, 512. The components 510, 512 may be configured to receive sensory information 508, 509, respectively. In one or more implementations, the sensory input 508, 509 may comprise all or a portion of sensory information available to the apparatus 500. In some implementations, the sensory information may comprise, e.g., the input 202 described above with respect to FIG. 2. By way of an illustration, the sensory input 508, 509 may comprise data from one or more sensors (audio, video, radio frequency, positioning, inertial, environmental, and/or other sensors) characterizing robotic apparatus and/or its environment, state (feedback) of the robotic platform (e.g., motor torque, current draw, battery voltage, position of actuators and/or controllable elements (e.g., rotor blade, rudder, wheel), and/or other parameters (e.g., depth/range map obtained from vision input using, e.g., LiDAR, structured light and/or other techniques).

In one or more implementations, individual ones of the sensory inputs 508, 509 may be configured different from one another, e.g., comprising a subset of the available sensory information. By way of an illustration, the input 508 may comprise visual data (e.g., video camera output). The input 509 may comprise one or more short-distance sensor output (e.g., IR, sonar, and/or other) used to determine the location of the obstacle relative to the robotic platform (e.g., 230 in FIG. 2). The control process of component 512 may be configured utilize the sensory input 509 (e.g., to determine location of obstacles) and/or the input 506 (e.g., to determine current action). The information 506, 509 may be combined by the control process of component 512 to produce the output 516. By way of an illustration, information 506 may indicate that the robot may be executing a turn (in accordance with the training input 504). Information 509 may indicate presence of an obstacle that may potentially interfere with the turn trajectory. Taking into account the current action information (e.g., the turn being executed) the process 512 may determine output 516 such that the turn trajectory is adjusted to avoid collision with the obstacle while accomplishing the target turn (e.g., 90° left). Execution obstacle avoidance in absence of the current action information may cause the robot to reverse its motion trajectory so as to recede from the obstacle. Such action may be contrary to the intent by the trainer as expressed by the training signal 504).

Predictor components 510, 512 may be configured to determine predicted output (506, 516, respectively). The predictor component 510 may be configured to operate an unattended control process, e.g., comprising a programmed, a pre-trained and/or otherwise pre-configured process that may be operable without input from a trainer, e.g., as described above with respect to FIG. 3 and/or FIGS. 4A-4B.

The predictor component 512 may be configured to operate a learning control process configured based on a teaching input 504 from an external (e.g., with respect to the component 512) agent. In some implementations, the component 512 may comprise the adaptive predictor 222 described above with respect to FIG. 2. The teaching input 504 may comprise an output of a combiner component (e.g., the output 204 in FIG. 2) configured based on a training input (e.g., 208 in FIG. 2). In one or more implementations of robotic vehicle navigation, the training input 504 may comprise target vehicle velocity and/or target vehicle steering angle. Such implementations may comprise an "override" functionality configured to cause a robot to execute action in accordance with the trainer-provided control signal instead of the predicted control signal. In some implementations, the training input 504 may comprise a correction (an increment/decrement) to vehicle velocity and/or direction, and/or other parameters. In one or more implementations, a training signal may convey one or more of a speed of the robot, a position of a multi joined arm (e.g., Baxter arm), a position of a gripper (e.g., open/close), a combination thereof and/or other information.

In some implementations, the pre-programmed predictor component 510 may be used to produce output 506 for, e.g., navigating a given trajectory (e.g., 800 in FIG. 8). The learning predictor may be configured to produce corrections to the input 506 and provide corrected output 516. In some implementations, the output 516 may comprise control output configured for a robotic platform (e.g., the output 220 for the platform 230 in FIG. 2) and/or corrections provided to a combiner component (e.g., 208 for the component 214 in FIG. 2).

In some implementations, the hybrid controller architecture (e.g., the cascaded architecture of FIG. 5A) may be employed in order to reduce computational hardware complexity and/or costs associated with operating a learning process configured to implement all of the functionality for a given task (e.g., navigating a trajectory with sharp turns and/or unexpected obstacles by a robotic vehicle, balancing a manipulator arm and reaching for an object with a manipulator, and/or other applications). By separating a portion of the task control to a pre-configured predictor process (e.g., 512), the learning process computational complexity may be reduced. Such computational complexity reduction may be leveraged for a capability to execute more complex tasks using a given computational platform, and/or enabling use of simpler and/or lower cost computational hardware.

In some implementations, the output 506 may comprise prediction confidence information (e.g., variance, percent good, and/or other measure). The confidence information may be utilized by the predictor component 512 in order to determine instances when the programmed predictor output 510 may needs improvement.

In one or more implementation, the hybrid controller 500 of FIG. 5 may be utilized as a predictor component in a robotic system, e.g., the predictor 222 of the system 200 described above with respect to FIG. 2.

Figure 5B:
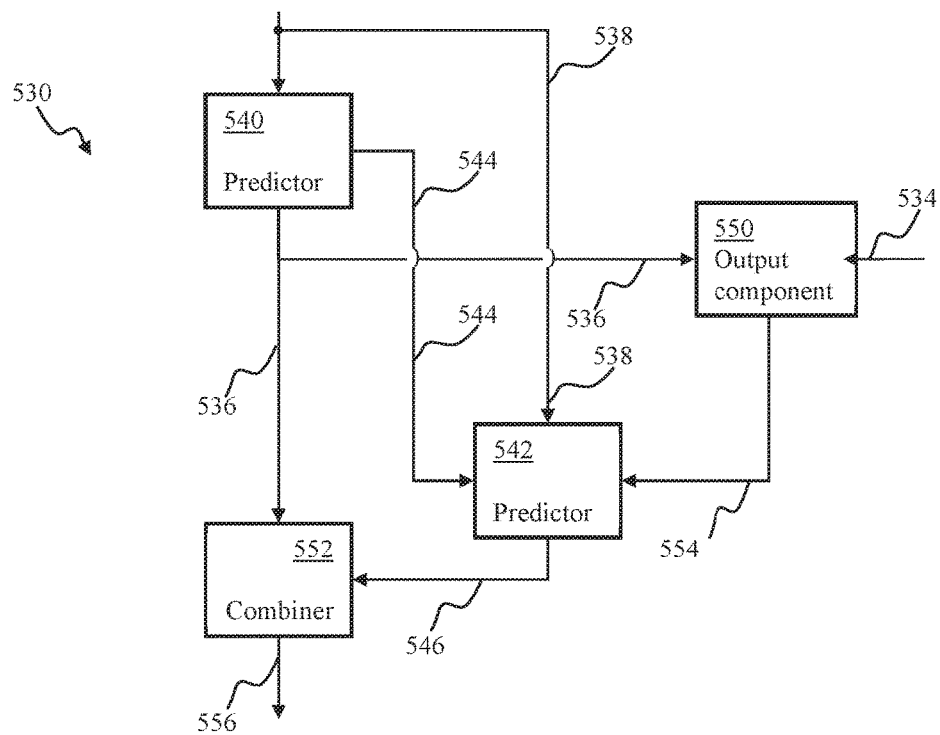
FIG. 5B is a block diagram illustrating a control apparatus comprising cascaded predictors configured to determine a control output based on sensory input, according to one or more implementations.

FIG. 5B illustrates a control apparatus comprising a cascaded predictor configuration for determining a control output based on sensory input, according to one or more implementations.

The apparatus 530 in FIG. 5B may comprise predictor component 540 configured to operate a pre-configured/pre-trained process. By way of an illustration, the component 540 may be pre-trained to enable a pre-configured behavior for a robotic device. The pre-configured (e.g., out of the box) behavior may be configured based on control output 536 configured based on analysis of sensory input 538. By way of an illustration, the pre-configured behavior may comprise navigation of the trajectory 800 of FIG. 8.

In some implementations, the sensory information 538 may comprise, e.g., the input 202 described above with respect to FIG. 2. By way of an illustration, the sensory input 538 may comprise one or more of information received from one or more sensors (e.g., audio, video, radio frequency, positioning, inertial, environmental, and/or other sensors) characterizing robotic apparatus and/or its environment, a state (feedback) of the robotic platform (e.g., motor torque, current draw, battery voltage, position of actuators and/or controllable elements (e.g., rotor blade, rudder, wheel), and/or other parameters), and/or other information.

The apparatus 530 in FIG. 5B may comprise predictor component 542 configured to operate learning prediction process, e.g., such as described above with respect to FIGS. 4A-5A, to produce output 546. The apparatus 530 may comprise a combiner component 552 configured to produce a control output 556 (e.g., motor activation output) configured based on a combination of the outputs 536, 546 of the components 540, 542, respectively. The component 540 may provide output 544 comprising information conveying quality of the prediction (e.g., prediction confidence, variance, percent good, and/or other measure).

The apparatus 530 may be operable to perform a task (e.g., behavior) based on the output 536. In absence of training input 534, the output 546 of the learning process of the component 542 may comprise a null signal (e.g., zero value, baseline signal (e.g., base voltage, frequency, pulse rate) and/or other signal configured not to cause changes in the system output 556).

During operation of the apparatus 530, a user may elect to improve performance associated with execution of a task based on the output 536. By way of an illustration, a user may wish to train the apparatus 530 to navigate the trajectory 800 of FIG. 8 in presence of obstacles and/or to traverse turn portions (e.g., 806, 808) in shorter time.

In some implementations, methodology described with respect to FIG. 5B may be employed when a controller apparatus (e.g., 600 of FIG. 6) may comprise processing, energy, memory, and/or other resources that may prove insufficient for implementing a fully trainable implementations.

The task execution performance improvement may be configured based on a training input 534. In some implementations, the input 534 may comprise a motor control command provided by a user and/or a training entity (e.g., a trained computerized agent). Component 550 of the apparatus 530 may be configured to produce output 554 configured based on an evaluation of the output 536 of the pre-configured component 540 and the training input 534. In some implementations, the operation effectuated by the component 550 may comprise a difference, a comparison, and/or other operation configured to determine a discrepancy between the inputs 534, 536.

The discrepancy output 554 may be provided to the learning predictor component 542 as a teaching input. The learning process of the component 542 may be configured to produce output 546 based on analysis of the sensory input 538, the confidence output 544 of the predictor 540 and the teaching input 554. Learning process of the component 552 may be adjusted in order to develop an association between an instance of the sensory input 538 (e.g., an object representation) and the discrepancy output 554. Various machine learning approaches may be utilized with the component 552, e.g., an artificial neuron network, a look up table, and/or other approaches such as random forests, and a Bayes classifier with conditionally independent feature model, such as described in e.g., co-owned U.S. patent application Ser. No. 13/756,372 entitled "SPIKING NEURON CLASSIFIER APPARATUS AND METHODS USING CONDITIONALLY INDEPENDENT SUBSETS", filed Jan. 31, 2013, and issued as U.S. Pat. No. 9,195,934 the foregoing being incorporated herein by reference in its entirety, regression, nearest neighbor algorithms, e.g., such as described in co-owned and co-pending U.S. patent application Ser. No. 14/588,168 entitled "APPARATUS AND METHODS FOR TRAINING OF ROBOTS", filed Dec. 31, 2014, the foregoing being incorporated herein by reference in its entirety.

Output of the predictor component 536, 546 may be combined by component 552 to produce the control output 556. In one or more implementations, the combination process 556 may comprise an addition operation, a union operation, a weighted sum, an average, a concatenation and/or other operation.

By way of an illustration, the apparatus 530 may be configured to operate a robotic vehicle (e.g., 100 in FIG. 1) along a trajectory at a speed no greater than a posted limit (e.g., 40 km/h (25 miles/hour)). The pre-configured predictor component 540 may produce output 536 configured to drive the vehicle at a speed of 45 km/h, e.g., at a downhill portion of the trajectory. A trainer may utilize the training input 534 to provide a target speed of 40 km/h. The component 550 may produce a discrepancy output of −5 km/h. The learning predictor 542 may receive the sensory information (e.g., visual and/or motion data indicating a downhill portion of the trajectory) and the teaching input of −5 km/h. The predictor may initially (e.g., upon first presentation of a given sensory input-teaching input combination (context)) produce output 556 of −3 km/h. Output 45 km/h of the pre-programmed predictor may be combined with the learned correction of −3 km/h by the component 552 to produce the output 556 of 42 km/s. Upon encountering multiple presentations of the context, the predictor 542 may adjust its learning process to produce the target output (e.g., −5 km/h).

In some implementations, the output 556 may be provided to one or more component of a robotic platform (e.g., motors of a vehicle 100). The output 556 may be routed to a combiner component, e.g., 214 in FIG. 2. In some implementations, the output 556 may be combined with the teaching input 534 via the combiner. Such may enable use of the training signal 534 to control the robot directly when the training signal is available. In the above example, if the robot speed is in excess of the target speed (e.g., 42 km/h) the training signal of 40 km/h may be utilized to prevent navigation by the robot in excess of the maximum allowed speed of 40 km/h thereby improving safety and/or reducing probability of a collision. Accordingly, when the training signal is present, it may be used by a combiner to override the output 556 produced by the component 552 and to provide the training signal 534 as the motor output.

Figure 6:
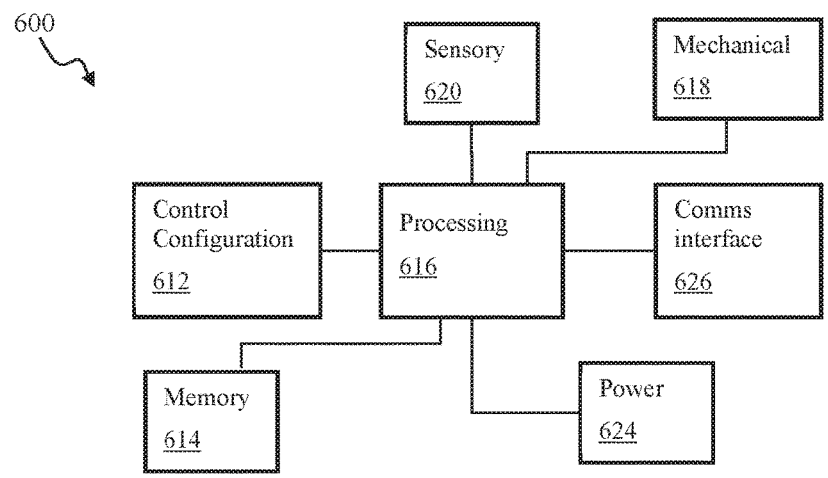
FIG. 6 is a functional block diagram illustrating components of a robotic controller apparatus for use with the programming and training robotic control methodology, in accordance with one or more implementations.

FIG. 6 illustrates components of a robotic controller apparatus for use with the programming and training robotic control methodology, in accordance with one or more implementations. The robotic controller apparatus 600 may comprise a control configuration component 612 for implementing a control process. In some implementations, the control configuration may comprise a learning process (also referred to as the robotic brain) (e.g., for implementing predictor 412, 482, 512 in FIGS. 4A-4C, 5, respectively), and/or pre-configured process (e.g., for implementing predictor 410, 480, 512 of FIGS. 4A, 4C, 5). The learning configuration component may be logically implemented within a processor that executes a computer program embodied as instructions stored in non-transitory computer readable media, and configured for execution by the processor. In some implementations, the robotic brain may be implemented as dedicated hardware, programmable logic (e.g., field programmable gate arrays (FPGAs), and/or other logical components), application specific integrated circuits (ASICs), and/or other machine implementations. Memory 614 and processing components 616 may be available for other hardware/firmware/software needs of the robotic device. The memory component 614 may be configured to store computer executable instructions configured to effectuate a pre-configured predictor component operation (e.g., 410, 480, 510 and/or other) The processing component 616 may interface to the sensory component 620 in order to perform sensory processing e.g., object detection, face tracking, stereo vision, and/or other tasks.

The processing component 616 may interface with the mechanical components 618, sensory components 620, electrical components 622, power components 624, and communications (comms) component 626 via one or more driver interfaces and/or software abstraction layers. In one or more implementations, the power components 624 may comprise one or more of a direct current, an alternating current source, a mechanical coupling, an energy accumulator (and/or a mechanical energy means (e.g., a flywheel, a wind-up apparatus), a wireless charger, a radioisotope thermoelectric generator, a piezo-generator, a dynamo generator, a fuel cell, an internal or external combustion engine, a pneumatic power source, a hydraulic power source, and/or other power sources.

Additional processing and memory capacity (not shown) may be used to support these processes. However, it will be appreciated that the aforementioned components (e.g., mechanical components 618, sensory components 620, electrical components 622) may be fully controlled based on the operation of the learning configuration 612. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The mechanical components 618 may include virtually any type of component capable of motion (e.g., to move the robotic apparatus 600, manipulate objects external to the robotic apparatus 600 and/or perform other actions) and/or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the learning configuration and enable physical interaction and manipulation of the device.

The sensory components 620 may enable the robotic device to accept stimulus from external entities. Input stimulus types may include, without limitation: video, audio, haptic, capacitive, radio, accelerometer, ultrasonic, infrared, thermal, radar, LiDAR, sonar, and/or other sensed inputs.

The electrical components 622 may include virtually any electrical component for interaction and manipulation of the external environment. These may include, without limitation: light/radiation generating components (e.g. light emitting diodes (LEDs), infrared (IR) sources, incandescent light sources, and/or other components), audio components, monitors/displays, switches, heating elements, cooling elements, ultrasound transducers, lasers, and/or other. Such components enable a wide array of potential applications in industry, personal hobbyist, building management, medicine, military/intelligence, and other fields.

The communications component 626 may include one or more connections configured to interact with external computerized devices to allow for, inter alia, management and/or control of the robotic device. The connections may include any of the wireless or wireline interfaces discussed above, and further may include customized or proprietary connections for specific applications.

The power system 624 may be configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of the robotic apparatus 600. Thus, the robot may improve its efficiency (e.g., to consider power consumption efficiency) through learned management techniques specifically tailored to the tasks performed by the robotic apparatus.

Figure 7:
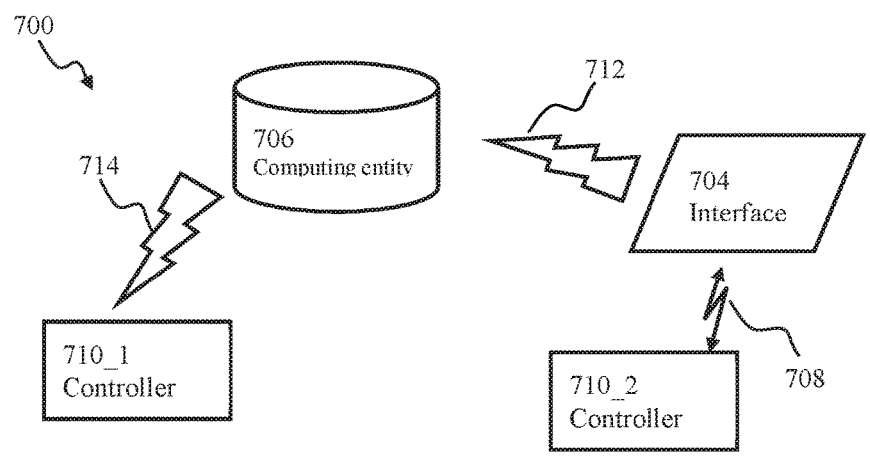
FIG. 7 is a functional block diagram depicting a system comprising robotic controller apparatus, according to one or more implementations.

FIG. 7 illustrates a computerized system comprising a controller apparatus of the disclosure, in accordance with one implementation. The system 700 may comprise a computerized entity 706 configured to communicate with one or more controllers 710 (e.g., 710_1, 710_2). In some implementations, the entity 706 may comprise a computing cloud entity (e.g., a cloud service, a server, in a public, private or hybrid network). In one or more implementations, the entity may comprise a computer server, a desktop, and/or another computing platform that may be accessible to a user of the controller 710. In some implementations of the cloud computing services, one or more controller apparatus 710 may communicate with the entity 706 in order to access computing resources (e.g., processing cycles and/or memory) in order to, e.g., detect features and/or objects in sensory data provided by, e.g., sensor module 166 of FIG. 1. In some implementations, the controller apparatus 710 may communicate with the entity 706 in order to save, load, and/or update, their processing configuration (e.g., the configuration 612 in FIG. 6). The robotic brain images may comprise executable code (e.g., binary image files), bytecode, an array of weights for an artificial neuron network (ANN), and/or other computer formats. In some implementations, the controller apparatus 710 may communicate with the entity 706 in order to save, and/or retrieve learned associations between sensory context and actions of a robot, e.g., as described in co-owned U.S. patent application Ser. No. 14/244,888, entitled "LEARNING APPARATUS AND METHODS FOR CONTROL OF ROBOTIC DEVICES VIA SPOOFING", filed Apr. 3, 2014 and incorporated herein by reference in its entirety.

In FIG. 7, one or more controller apparatus (e.g., 710_1) may connect to the entity 706 via a remote link 714, e.g., WiFi, and/or cellular data network. In some implementations, one or more controller apparatus (e.g., 710_2) may connect to the entity 706 via a local computerized interface device 704 using a local link 708. In one or more implementations, the local link 708 may comprise a network (Ethernet), wireless link (e.g. Wi-Fi, Bluetooth, infrared, radio), serial bus link (USB, Firewire,) and/or other. The local computerized interface device 704 may communicate with the cloud server entity 706 via link 712. In one or more implementations, links 712 and/or 714 may comprise an internet connection, and/or other network connection effectuated via any of the applicable wired and/or wireless technologies (e.g., Ethernet, Wi-Fi, LTE, CDMA, GSM, and/other protocols).

In one or more applications that may require computational power in excess of that that may be provided by a processing module of the controller 710_2 the local computerized interface device 704 may be used to perform computations associated with training and/or operation of the robotic body coupled to the controller 710_2. The local computerized interface device 704 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

Figure 9:
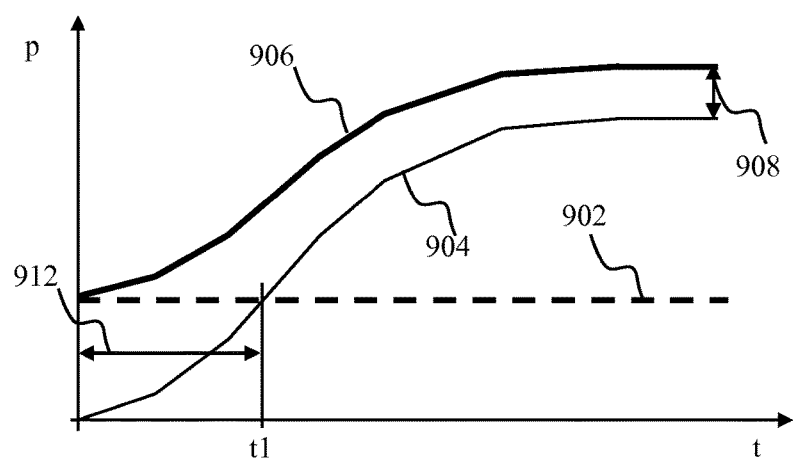
FIG. 9 is a plot depicting performance of a controller apparatus of, e.g., FIG. 4A-4C, according to one or more implementations.

FIG. 9 illustrates performance of a controller apparatus of, e.g., FIG. 4A-4B, according to one or more implementations.

Curves 904, 906 depict performance measure p as a function of time t. The performance measure p in FIG. 9 may correspond to probability of success (determined, e.g., as a ratio of number of times a task was completed over number of times the task was attempted). In some implementations (not shown) the performance measure may comprise one or other parameters, e.g., used energy, elapsed time along trajectory, deviation from target trajectory (e.g., RMS error, maximum absolute deviation), and/or other measures. Curve 902 in FIG. 9 may correspond to performance obtained by a controller (e.g., 400, 440, 470, 500 described above with respect to FIGS. 4A-5) configured based on operation of the preconfigured/unattended predictor (e.g., 410, 450, 480, 510). In some implementations, e.g., such as illustrated in FIG. 9, performance of the unattended/preconfigured control process may be characterized by a steady level of performance (e.g., as depicted by horizontal line 902). In one or more implementations of an adaptive pre-configured control process (e.g., Kalman filter not shown), performance of the unattended/preconfigured control process may converge to the level 902 at time scales t<<t1 (e.g., t~0.1 t1).

Curve 904 in FIG. 9 may correspond to performance obtained by a hybrid control process (e.g., 400, 440, 470, 500 described above with respect to FIGS. 4A-5) configured based on operation of the learning predictor (e.g., 412, 452, 482, 512). Initially (e.g., at time interval 912 t<t1) performance obtained using the learning predictor may be below performance of the pre-configured predictor. At time greater than t1 performance of the learning predictor may exceed performance of the pre-configured predictor.

Curve 906 illustrates performance of a controller apparatus comprising the learning predictor and the pre-configured predictor. As may be seen from FIG. 9, the performance of the combined controller remains above performance of the individual controllers. Upon completion of training, the combined controller (e.g., pre-configured and learning) approach may provide for an improved performance (by amount 908) over controller operable solely using the learning combiner.

Figure 12A:
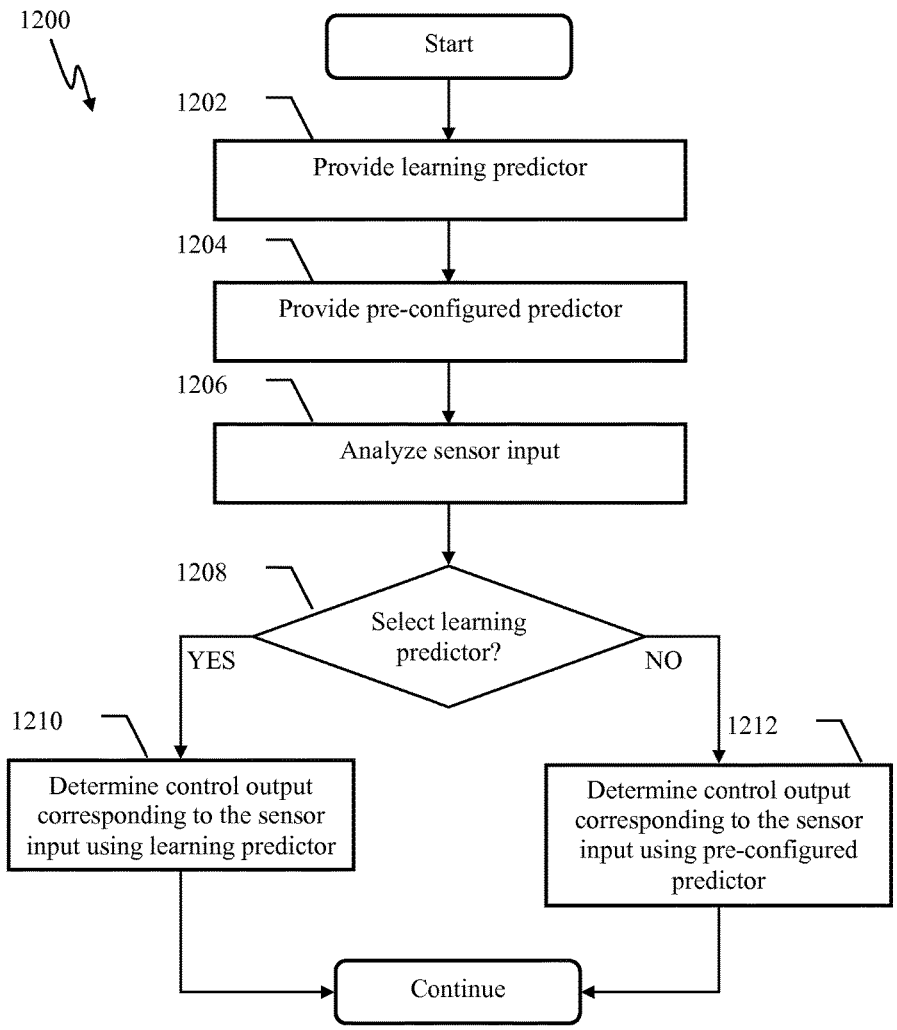
FIGS. 12A-12C illustrate exemplary methods of operating an adaptive apparatus comprising a pre-configured and a learning prediction components, according to one or more implementations.
Figure 12B:
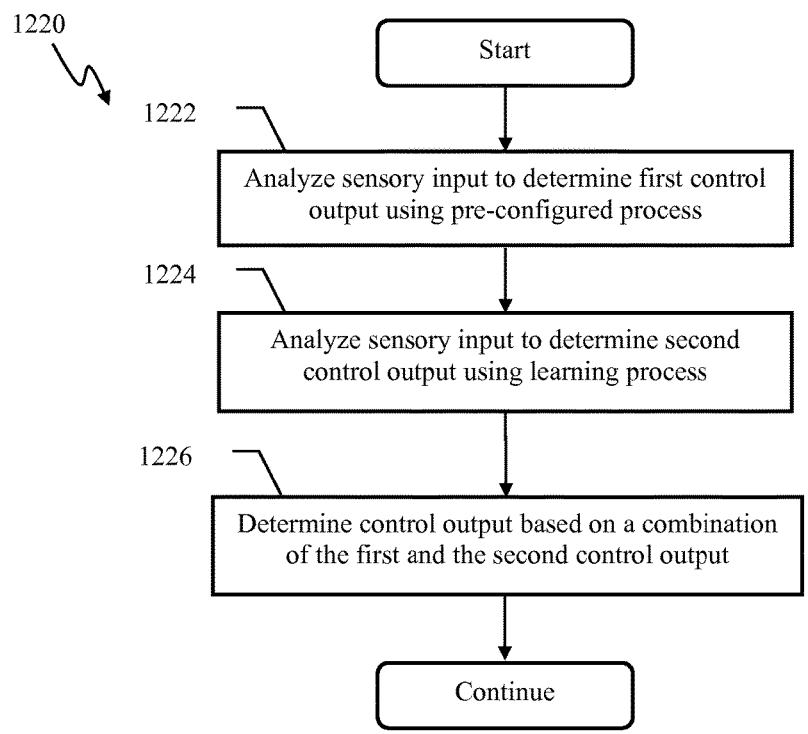

FIGS. 12A-12B illustrate methods of training and/or operating computerized robotic controller of the disclosure in accordance with one or more implementations. The operations of methods 1200, 1220 presented below are intended to be illustrative. In some implementations, methods 1200, 1220 may be accomplished with one or more additional operations not described, and/or without one or more of the operations discussed. Additionally, the order in which the operations of methods 1200, 1220 are illustrated in FIGS. 12A-12B described below is not intended to be limiting.

Methods 1200, 1220 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 1200, 1220 in response to instructions stored electronically on a non-transitory electronic storage medium. The one or more processing devices may include one or more devices configured through hardware, firmware, and/or software to be specifically designed for execution of one or more of the operations of methods 1200, 1220. The operations of methods 1200, 1220 may be implemented by a controller apparatus (e.g., 600 in FIG. 6) configured to control a robotic apparatus (e.g., 100 in FIG. 1).

Figure 12C:
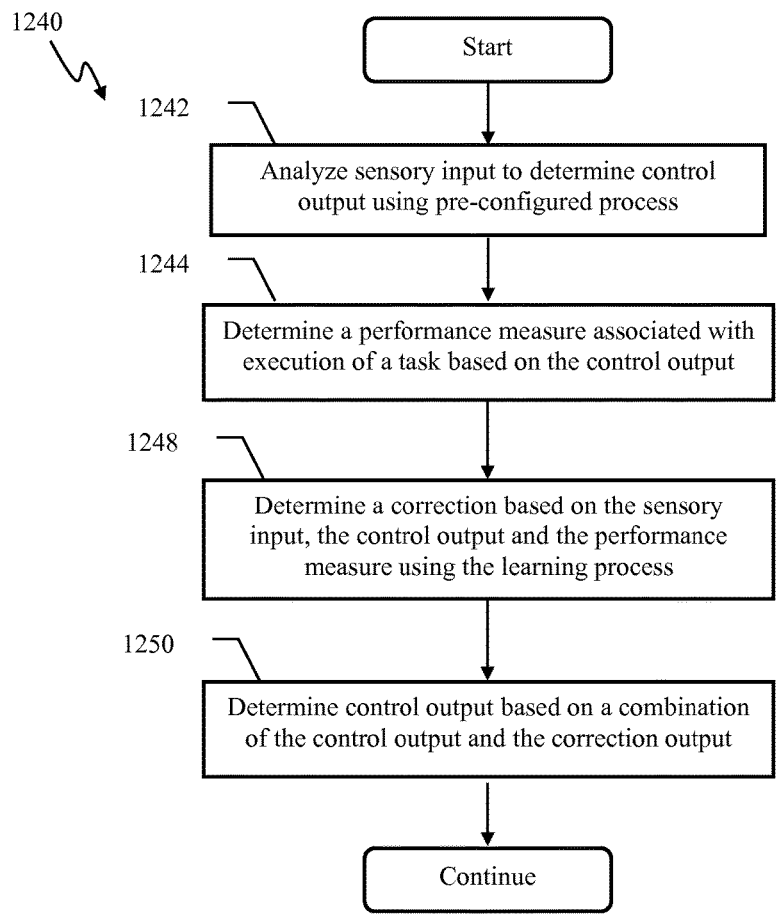

FIGS. 12A-12C illustrate exemplary methods of operating an adaptive apparatus comprising a pre-configured and a learning prediction components, according to one or more implementations. The operations of methods 1200, 1220, 1240 presented below are intended to be illustrative. In some implementations, methods 1200, 1220, 1240 may be accomplished with one or more additional operations not described, and/or without one or more of the operations discussed. Additionally, the order in which the operations of methods 1200, 1220, 1240 are illustrated in FIGS. 12A-12C described below is not intended to be limiting.

Methods 1200, 1220, 1240 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 1200, 1220, 1240 in response to instructions stored electronically on a non-transitory electronic storage medium. The one or more processing devices may include one or more devices configured through hardware, firmware, and/or software to be specifically designed for execution of one or more of the operations of methods 1200, 1220, 1240. The operations of methods 1200, 1220, 1240 may be implemented by a learning controller apparatus (e.g., 400, 440, 470, 500, 530 in FIGS. 4A-5B) configured to control a robotic device (e.g., 100 in FIG. 1).

FIG. 12A illustrates operation of a controller comprising a pre-configured predictor and a learning predictor, in accordance with one or more implementations. Operations of method 1200 may be employed by a robotic device configured to execute a task (e.g., navigate trajectory 800 in FIG. 8, perform refuse collection operation, and/or other task).

At operation 1202 of method 1200, a learning predictor may be provided. In one or more implementations, the learning predictor provision may comprise providing a computer readable code configured to implement a learning predictor component of the disclosure (e.g., described above with respect to components 412, 452, 482, 512, 542 of FIGS. 4A-5B, respectively). In one or more implementations, the learning process provision may comprise configuring learning rate, learning process type (e.g., supervised, unsupervised, reinforcement), and/or other operations.

At operation 1204 a pre-configured predictor may be provided. In one or more implementations, the pre-configured predictor provision may comprise providing a computer readable code configured to implement a pre-configured prediction process of the disclosure (e.g., described above with respect to components 410, 450, 480, 510, 540 of FIGS. 4A-5B, respectively). In one or more implementations, the pre-configured process provision may comprise loading learned configuration (e.g., array of ANN efficacies, array of LUT, and/or other) obtained prior during based on training of a behavior, and/or other operations.

At operation 1206 sensor input may be analyzed. In some implementations, sensor input may comprise one or more of audio, video, range, acoustic, IR, structured light, LiDAR, radio frequency, positioning, inertial, environmental, and/or other sensors characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight), inputs from appliances such as valves, doors, locks, light switches, light fixture status, entertainment components, and/or other data. In some implementations, the sensory data may comprise pre-processed data e.g., edges, color patches obtained from camera data, platform speed, tilt obtained from inertial measurements, and/or other processed data.

In one or more implementations of visual data processing, the sensor data may comprise a plurality of features that may be detected in the sensory output may comprise representations of objects, corner, edges, patches of texture, color, brightness, and/or other patterns that may be present in visual output; audio patterns (e.g., speech elements), and/or other persistent signal patterns that may be relevant to a given task. It is noteworthy, that a given pattern and/or data item (e.g., representation of an orange fruit on a tree and/or time of day) may comprise a relevant feature for one task (e.g., harvesting of oranges) and may be ignored by other tasks (e.g., navigation around trees). Various feature detection methodologies may be applied to processing of the sensor output. In some implementations, the feature detection may be configured to implement a filter operation (e.g., orange mask to detect orange objects); a Radon transform edge detection; corner detection (e.g., using Harris operator), texture detection (e.g., using Laws masks); patterns of motion (e.g., using optical flow); and/or other methodologies.

At operation 1208 a determination may be made as to whether the learning predictor may be selected. The determination may be based on analysis of sensory input, task parameters, state of the robot, and/or other parameters. The determination operation 1208 may be configured based on a fixed (e.g., pre-configured non-learning) process and/or a learning process e.g., as described above with respect to FIGS. 4A-4B. In some implementations, the selection process may comprise a pre-programmed, a previously trained process, and/or pre-configured adaptive process (e.g., Kalman filter), a learning process (e.g., using one or more of supervised, reinforcement learning approaches).

Based on determination that the learning predictor may be selected the method may proceed to operation 1210 wherein control output corresponding to the sensor input using learning predictor may be determined.

By way of illustration of one such implementation of a robotic manipulator operable to collect objects, the determination operation 1208 may utilize visual, position, and/or other sensors in order to determine location of the grasping component relative an object. Upon detecting that an object may be present proximate the gripper, the selection process may select learning predictor in order to enable the gripper learning controller to produce control signal for object grasping. The learning controller operation may be configured based on training input, e.g., the input 404, 44, 474 described above with respect to FIGS. 4A-4C.

Based on determination at operation 1208 that the pre-configured predictor may be selected the method may proceed to operation 1212 wherein control output corresponding to the sensor input using pre-configured predictor may be determined. By way of illustration of one such implementation of a robotic manipulator operable to collect objects, upon detecting that no objects are being proximate the gripper, the selection process may select the pre-configured predictor (reflexive behavior) in order to produce control signal configured to implement exploration of the environment by the robot in order to locate objects.

FIG. 12B illustrates a generalized method of operating a controller apparatus comprising a pre-configured predictor and a learning predictor, in accordance with one or more implementations. Operations of method 1220 may be employed by the controller of a robotic apparatus characterized by, e.g., multiple DOF, e.g., such as described above with respect to FIG. 4C.

At operation 1222 of method 1220 sensory input may be analyzed and first output may be determined using a pre-configured prediction process. In one or more, the sensory input analysis may comprise operations described above (e.g., with respect to FIGS. 1-5B and/or 12A). The first output may comprise one or more of motor commands, prediction confidence, action indication, and/or other output configured to enable task execution by the robotic apparatus. In some implementations of operating a robotic device characterized by a plurality operational degrees of freedom (DOF), the first output may comprise control signal configured to operate a portion of the DOF (e.g., an actuator controlling forward/backward motion of a vehicle).

At operation 1224 sensory input may be analyzed and to determine second control output using a learning process. The second output may comprise one or more of motor commands, prediction confidence, action indication, and/or other output configured to enable task execution by the robotic apparatus. In some implementations of operating a robotic device characterized by a plurality operational DOF, the second output may comprise control signal configured to operate another portion of the DOF (e.g., an actuator controlling left/right motion of the vehicle) compared to the output produced at operation 1222. In one or more implementations, the first and the second output obtained at operations 1222, 1224 may be configured to operate the same set of actuators.

At operation 1226 control output may be determined based on a combination of the first and the second control output. In some implementations, operation 1226 may be configured to select one of the first or the second output as the control output based on analysis of prediction confidence of the first and the second outputs. In one or more implementations, operation 1226 may be configured to combine the first output and the second output using averaging, a weighted average, and or other operation.

In one or more implementations wherein the control output may be configured to operate multiple DOF of a robotic device, operation 1226 may be configured to concatenate the first output with the second output to produce the control output.

FIG. 12C illustrates operation of a controller comprising a pre-configured predictor and a learning predictor, in accordance with one or more implementations. Operations of method 1240 of FIG. 12C may be employed for, e.g., improving of existing behaviors and/or provision of additional (trained) behaviors, updating of existing behaviors when performing hardware upgrades and/or maintenance, and/or other tasks.

At operation 1242 of method 1240, sensory input may be analyzed to determine control output using the pre-configured process. In some implementations, the sensory input analysis may comprise operations described above (e.g., with respect to FIGS. 1-5B and/or 12A).

At operation 1244 a Determine a performance measure associated with execution of a task based on the control output may be determined. The performance measure determination may be based on evaluation of an actual trajectory associated with task execution based on the control output and a target trajectory for the task. Multiple task executions may be performed using multiple instances of operations 1242, 1244. In one or more implementations, the performance measure determination may comprise determination of a variety of parameters, e.g., number of failures, success rate, mean time between failures, average deviation from target, cumulative deviation from target, elapsed time, maximum elapsed time, maximum absolute deviation, used energy, proximity indicator status, presence (and number of collisions), and/or other parameters.

At operation 1248 a correction may be determined based on sensory input, the control output and the performance measure using the learning process. In some implementations, the correction determination by the learning process may be configured based on a training input (e.g., 404, 444, 474, 504 in FIGS. 4A-5A).

At operation 1250 an updated control output may be determined based on a combination of the control output and the correction. In some implementations, the combination may comprise an addition, a concatenation, a union, and/or other operation. In one or more implementations of an override combiner, the training input (e.g., of operation 1248) may comprise an override indication wherein the correction may be selected as the combined output.

Implementations of the principles of the disclosure may be applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An apparatus for controlling a robot, the apparatus comprising:
    a sensor interface configured to receive a first representation of an object associated with an environment of the robot;
    a predictor component configured to determine a first control output, the first control output being configured to cause the robot to execute a task in accordance with the first representation of the object;
    an input interface configured to receive a teaching input associated with a second representation of the object, the teaching input being configured to convey information related to a target trajectory associated with execution of the task by the robot;
    an evaluation component configured to provide a second control output based on an evaluation of the first control output and the teaching input;
    a learning predictor component configured to determine a third control output, the third control output being determined based on analysis of the first representation of the object and the second control output; and
    a combiner configured to combine the first control output and the third control output to produce a fourth control output, the fourth control output being configured to cause the robot to execute the task in accordance with the first representation of the object;
    wherein:
        execution of the task based on the fourth control output produces a first trajectory that is closer to the target trajectory compared to a second trajectory associated with execution of the task based on the first control output.

2. The apparatus of claim 1, wherein:
the learning predictor component is operable in accordance with a learning process, the learning process being configured to determine an association between the first representation of the object and the second control output; and
the learning process is characterized by a learning configuration that is adapted based on a first occurrence of the first representation of the object contemporaneously with provisioning of the second control output.

3. The apparatus of claim 2, wherein:
the learning process comprises a look up table comprising a plurality of entries; and
the determination of the third control output by the learning process increments an entry of the plurality of entries based on a second occurrence of the first representation of the object contemporaneously with provisioning of the third control output.

4. The apparatus of claim 2, wherein:
the learning predictor component is further configured to provide to the learning process a confidence information associated with the first control output;
the learning process comprises a look up table comprising a plurality of entries; and
the determination of the third control output by the learning process increments an entry of the plurality of entries based on a second occurrence of the first representation of the object contemporaneously with provisioning of the second control output where the confidence information satisfies a given condition.

5. The apparatus of claim 2, wherein:
the first representation of the object, the first control output, and the second control output comprise a plurality of features of a first type and one or more features of a second type; and
the determination of the third control output is effectuated by the learning process that comprises logic configured to:
    determine a subset of features by random selection of a portion of the plurality of features and at least one feature from the second input features;

compare individual features of the subset to corresponding features of a plurality of training feature sets, individual ones of the plurality of training feature sets comprising a number of training features, the number being equal to or greater than the quantity of features within the subset of features;

based on the comparison, determine a similarity measure for a given training set of the plurality of training feature sets, the similarity measure characterizing a similarity between features of the subset and features of the given training set;

responsive to the similarity measure breaching a threshold, select one or more training sets from the plurality of training sets;

determine one or more potential control outputs, individual ones of the one or more potential control outputs being associated with a corresponding training set of the plurality of training sets; and determine the third control output based on a transformation obtained from the one or more potential control outputs;

wherein:
individual ones of the plurality of training feature sets comprise features of the first type and at least one feature of the second type;

individual ones of the plurality of training feature sets are obtained during training operation of the robot, the training operation being performed responsive to receiving the teaching input from the robot; and individual ones of the one or more potential control outputs determined based on the teaching input and the features of the given training set.

6. The apparatus of claim 5, wherein the similarity measure is determined based on a difference between values of the features of the subset and values of the features of the given training set.

7. The apparatus of claim 5, wherein the similarity measure is determined based on a distance between individual features of the subset of features and corresponding features of the given training set.

8. The apparatus of claim 1, wherein execution of the task based solely on the third control output is configured to produce a third trajectory that is farther from the target trajectory compared to the second trajectory.

9. The apparatus of claim 1, wherein:
the robot comprises a vehicle, the vehicle comprising a platform configured to move in at least one dimension;
the apparatus is disposed on the platform; and
the teaching input is provided by an entity disposed external to the platform.

10. The apparatus of claim 9, further comprising:
a wireless communications interface configured to receive remote data transmissions from the entity;
wherein:
the teaching input is provided via the remote data transmissions; and
the teaching input is configured based on an evaluation of the second representation of the object, the second representation being distinct from the first representation.

11. The apparatus of claim 1, wherein the evaluation component is configured to produce the second control output based on a discrepancy between the first control signal and the teaching input.

12. The apparatus of claim 11, wherein the combiner is operable in accordance with at least one of an addition or a union operation on the first control output and the third control output.

13. The apparatus of claim 1, wherein the combiner is configured based on a concatenation of the first control output and the third control output.

14. The apparatus of claim 1, further comprising:
another combiner component configured to combine the fourth control output and the teaching input to produce a motor control output, the combination of the fourth control output and the teaching input being characterized by a transfer function;
wherein:
the robot comprises an actuator configured to displace at least a portion of the robot in at least one dimension based on application of the motor control output; and
the transfer function is configured to provide an override combination wherein the a motor control output is configured based solely on the teaching signal satisfying a given condition.

15. A method of determining a combined control output for a task being executed by a robot, the method comprising:
for a sensory context, determining a first instance of a control output using a pre-configured and non-learning prediction process and a second instance of the control output using a learning prediction process;

combining the first instance of the control output with the second instance of the control output using a combination process to produce a combined control output; and causing the task to be executed responsive to providing the combined control output to the robot;

wherein:
the learning prediction process is configured to determine the second instance of the control output based on a teaching input indicative of a target trajectory associated with the task execution; and execution of the task by the robot in accordance with the combined control output is configured to produce a trajectory that is closer to the target trajectory compared to task execution based on either the first instance of the control output or the second instance of the control output.

16. The method of claim 15, wherein:
the learning prediction process is configured to associate the sensory context with the target trajectory, the association being based on updating a parameter of the learning prediction process based on a contemporaneous occurrence of the sensory context and the teaching input.

17. The method of claim 16, wherein:
the robot comprises a plurality of actuators characterized by a first operational degree of freedom and a second operational degree of freedom;
the first instance of the control output is configured for operation within the first operational degree of freedom and the second instance of the control output is configured for operation within the second operational degree of freedom; and
the combination process comprises a concatenation operation.

18. A method of determining a control signal for a robot, the method being performed by one or more processors executing instructions stored by a non-transitory computer-readable storage medium, the method comprising:

determining an occurrence of a first context in sensory input;

accessing a learning process configuration, the learning process configuration adapted to convey an association between a given context and a respective action;

determining a first action associated with the first context;

responsive to the first action corresponding to a pre-programmed action, activating a pre-programmed predictor component to produce the control signal based on analysis of the sensory input;

responsive to the first action corresponding to a learned action, activating a learning predictor component to produce the control signal based on analysis of the sensory input and a training input; and updating the learning process configuration in accordance with the activated learning predictor component.

19. The method of claim 18, wherein:

the robot comprises an autonomous vehicle and a collector apparatus;

the pre-programmed action comprises an object search task configured based on a random exploration of environment by the robot; and the learned action comprises an object collection task configured based on the training input.

* * * * *